(12) United States Patent
Yamada

(10) Patent No.: US 9,307,167 B2
(45) Date of Patent: Apr. 5, 2016

(54) IMAGE PICKUP DEVICE AND IMAGE PICKUP DISPLAY SYSTEM FOR REDUCING AFTERIMAGE IN IMAGE OUTPUT

(71) Applicant: Sony Corporation, Tokyo (JP)

(72) Inventor: Yasuhiro Yamada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 415 days.

(21) Appl. No.: 13/649,582

(22) Filed: Oct. 11, 2012

(65) Prior Publication Data

US 2013/0093927 A1 Apr. 18, 2013

(30) Foreign Application Priority Data

Oct. 18, 2011 (JP) ................................. 2011-228628

(51) Int. Cl.
| | | |
|---|---|---|
| H04N 3/14 | (2006.01) | |
| H04N 5/32 | (2006.01) | |
| H04N 5/357 | (2011.01) | |
| H04N 5/378 | (2011.01) | |
| H04N 5/359 | (2011.01) | |
| H04N 5/217 | (2011.01) | |

(52) U.S. Cl.
CPC ................. *H04N 5/32* (2013.01); *H04N 5/357* (2013.01); *H04N 5/3597* (2013.01); *H04N 5/378* (2013.01)

(58) Field of Classification Search
CPC ..... H04N 5/357; H04N 5/3597; H04N 5/378; H04N 5/32
USPC .................. 348/308–310, 302, 241
See application file for complete search history.

(56) References Cited

U.S. PATENT DOCUMENTS

| | | | |
|---|---|---|---|
| 5,872,596 A * | 2/1999 | Yanai et al. ................... 348/297 |
| 6,130,713 A * | 10/2000 | Merrill ......................... 348/308 |
| 7,079,178 B2 * | 7/2006 | Hynecek .................... 348/222.1 |
| 7,609,303 B1 * | 10/2009 | Lee et al. ....................... 348/241 |
| 7,701,499 B2 * | 4/2010 | Barnea et al. ................. 348/308 |
| 7,728,889 B2 | 6/2010 | Apard et al. |
| 7,791,034 B2 * | 9/2010 | Kameshima et al. ..... 250/370.09 |
| 8,009,224 B2 | 8/2011 | Umeda |
| 8,014,187 B2 | 9/2011 | Kang et al. |
| 8,063,963 B2 * | 11/2011 | Dierickx ....................... 348/308 |
| 8,289,430 B2 | 10/2012 | Bechtel et al. |
| 8,582,010 B2 | 11/2013 | Cieslinski et al. |
| 2006/0180774 A1 | 8/2006 | Endo |
| 2008/0151091 A1 | 6/2008 | Hynecek |
| 2008/0218614 A1 * | 9/2008 | Joshi et al. ..................... 348/262 |
| 2009/0101798 A1 | 4/2009 | Yadid-Pecht et al. |
| 2010/0020594 A1 | 1/2010 | De Sandre et al. |
| 2011/0128428 A1 * | 6/2011 | Takatoku et al. ............. 348/307 |
| 2013/0001426 A1 * | 1/2013 | Tredwell et al. ......... 250/370.09 |
| 2013/0100302 A1 | 4/2013 | Senda et al. |
| 2013/0100327 A1 | 4/2013 | Senda et al. |

FOREIGN PATENT DOCUMENTS

JP 2011-135561 A 7/2011

* cited by examiner

*Primary Examiner* — Ngoc-Yen Vu
(74) *Attorney, Agent, or Firm* — Hazuki International, LLC

(57) ABSTRACT

An image pickup device includes: an image pickup section including a plurality of pixels, the pixels each including a photoelectric conversion element; a drive section performing a readout operation and a reset operation of a signal electric charge, the signal electric charge being accumulated in the pixel; and a correction section correcting a timing of performing the reset operation to allow an afterimage in an image output from the image pickup section to be reduced.

17 Claims, 22 Drawing Sheets

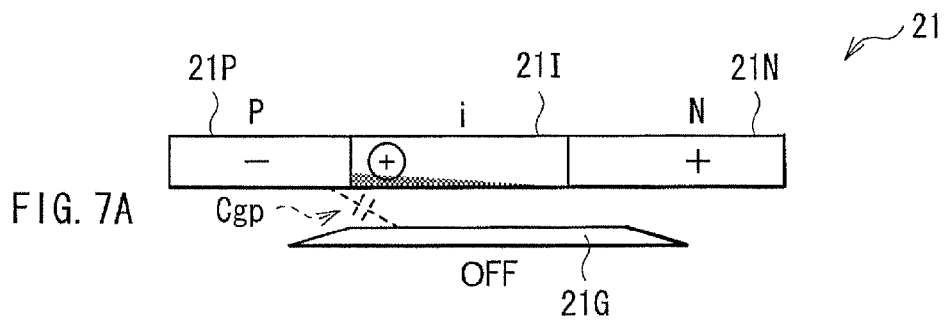
FIG. 7A ACCUMULATION STATE (Cgp:LARGE)
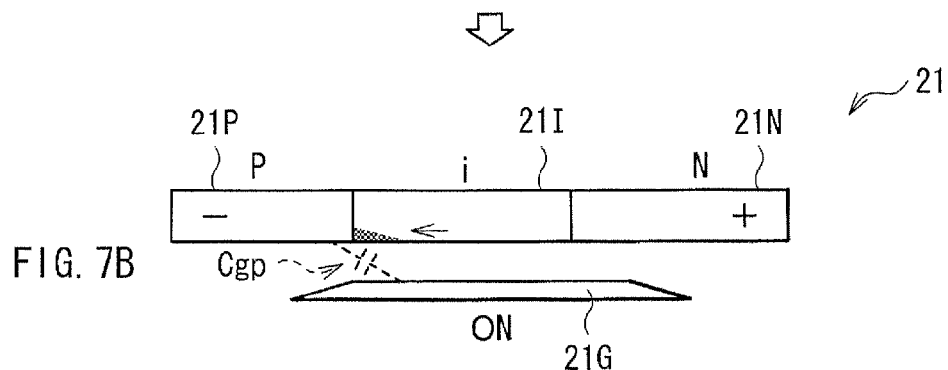
FIG. 7B DEPLETION STATE (Cgp:SMALL)
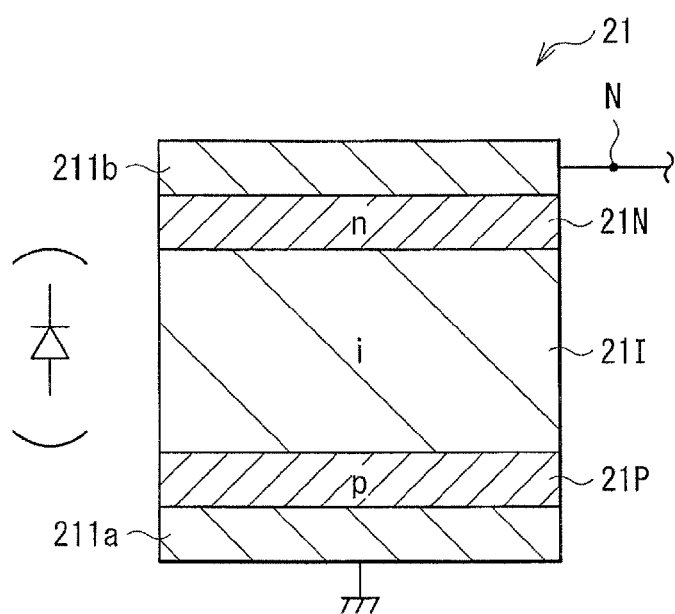
FIG. 8

IMMEDIATELY AFTER Tr1 ENDS
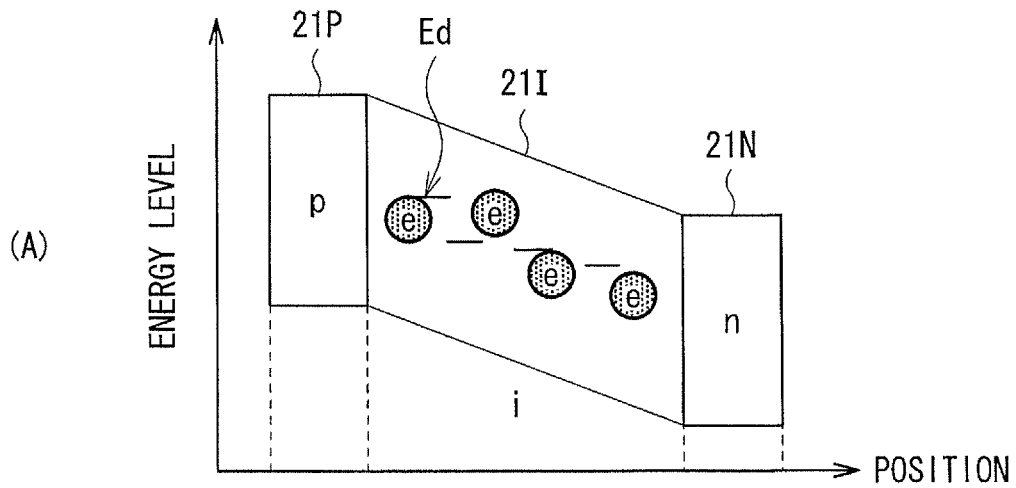
(A)
WHEN PREDETERMINED TIME PASSED AFTER Tr1
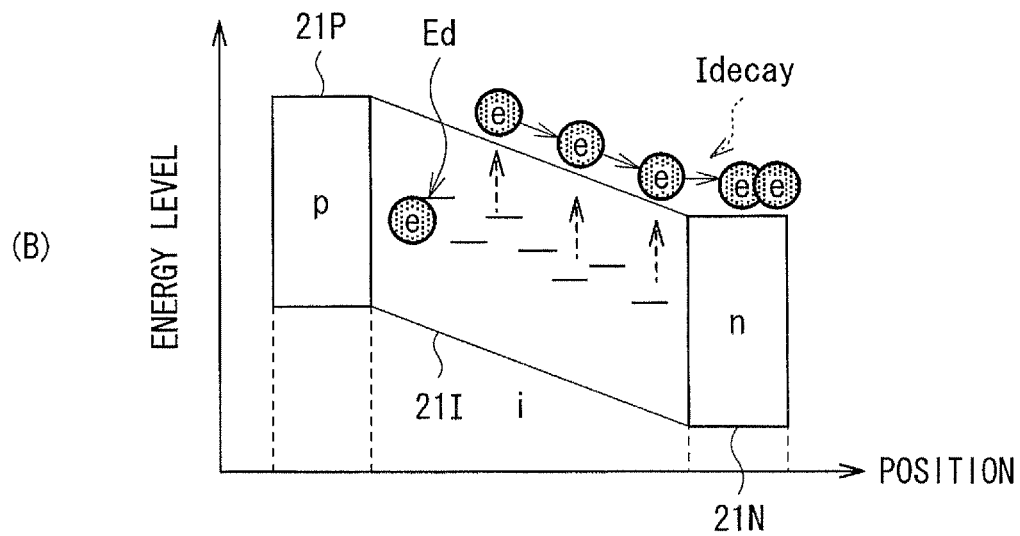
(B)
FIG. 10

IMAGE PICKUP DEVICE AND IMAGE PICKUP DISPLAY SYSTEM FOR REDUCING AFTERIMAGE IN IMAGE OUTPUT

BACKGROUND

The present disclosure relates to an image pickup device that includes a photoelectric conversion element, and an image pickup display system that includes such an image pickup device.

In the past, various types of image pickup devices have been proposed that includes a photoelectric conversion element in each pixel (image pickup pixel). Examples of such image pickup devices having the photoelectric conversion elements include a so-called optical touch panel, and a radiation image pickup device (for example, see Japanese Unexamined Patent Application Publication No. 2011-135561).

SUMMARY

A typical image pickup device as described above is configured to obtain an image, on the basis of signal electric charge read from a plurality of pixels. Meanwhile, there are cases where the obtained image contains a so-called afterimage (an image that is different from that of an actual object, and is based on signal electric charges that have been accumulated before the image is captured). This afterimage may deteriorate the quality of the picked-up image.

It is desirable to provide an image pickup device that achieves high quality in picked-up images, and an image pickup display system that includes such an image pickup device.

According to an embodiment of the present disclosure, there is provided an image pickup device including: an image pickup section including a plurality of pixels, the pixels each including a photoelectric conversion element; a drive section performing a readout operation and a reset operation of a signal electric charge, the signal electric charge being accumulated in the pixel; and a correction section correcting a timing of performing the reset operation to allow an afterimage in an image output from the image pickup section to be reduced.

According to an embodiment of the present disclosure, there is provided an image pickup display system including: an image pickup device; and a display device displaying an image based on an image pickup signal obtained by the image pickup device. The image pickup device includes: an image pickup section including a plurality of pixels, the pixels each including a photoelectric conversion element; a drive section performing a readout operation and a reset operation of a signal electric charge, the signal electric charge being accumulated in the pixel; and a correction section correcting a timing of performing the reset operation to allow an afterimage in an image output from the image pickup section to be reduced.

In each of the image pickup device and the image pickup display system according to the embodiments of the present disclosure, a photoelectric conversion based on incident light is performed in each pixel of the image pickup section, and the readout operation and the reset operation of the signal electric charge are performed as described above. As a result, a picked-up image based on the incident light is obtained. Furthermore, the correction section corrects the timing of performing the reset operation, so as to reduce an afterimage in the picked-up image.

In each of the image pickup device and the image pickup display system according to the embodiments of the present disclosure, each pixel in the image pickup section includes the photoelectric conversion element, and the drive section performs the readout operation and the reset operation of the signal electric charge in the pixels, thereby producing a picked-up image that is based on incident light. The correction section corrects the timing of performing the reset operation by the drive section, so as to reduce an afterimage in the picked-up image. This suppresses the occurrence of an afterimage due to the residual electric charge, even when electric charges are present (remain) after the signal electric charges are read out. Consequently, it is possible to achieve high quality in picked-up images.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Parts (A) and (B) of FIG. 7 are schematic views used to explain an accumulation state and a depletion state, respectively, of a PIN photodiode having a lateral structure.

FIG. 8 is a schematic cross-sectional view illustrating an example of a PIN photodiode having a vertical structure.

Figure 9:
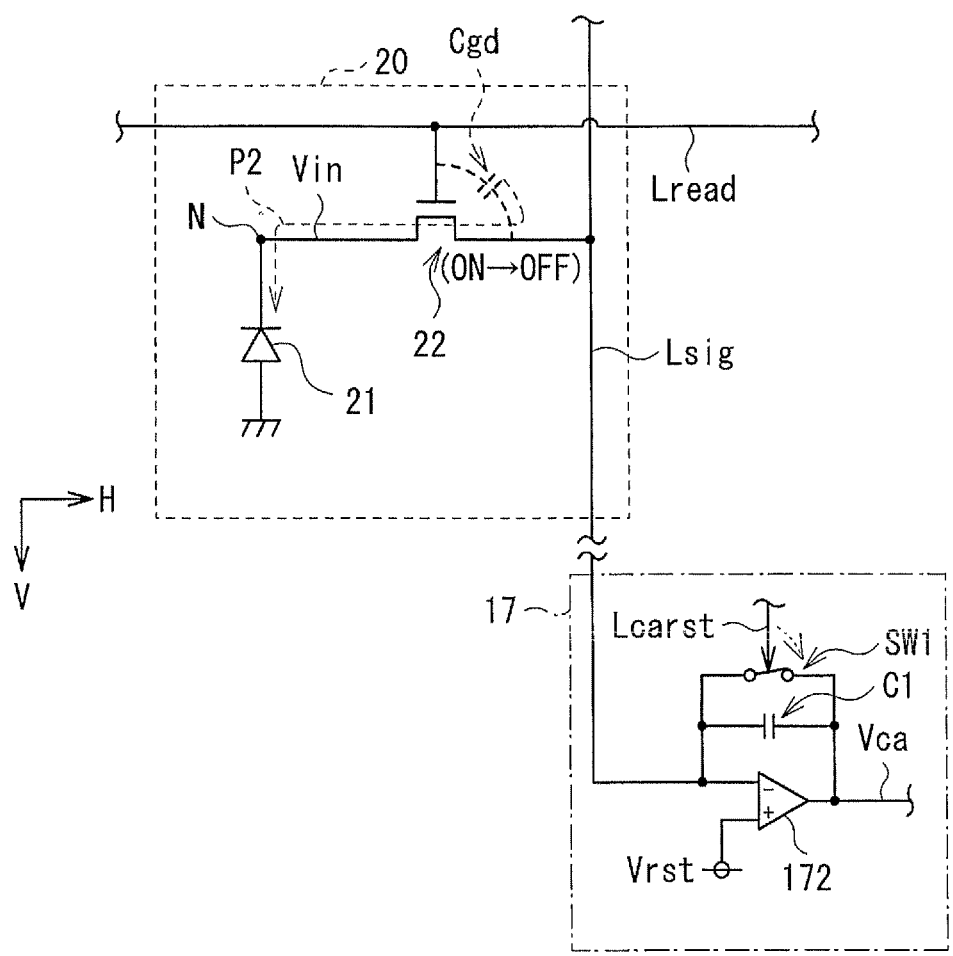

FIG. 9 is a circuit diagram used to explain a charge distribution phenomenon (charge injection).

FIG. 10 is a characteristic diagram used to explain a mechanism in which signal electric charge remains.

Figure 11A:
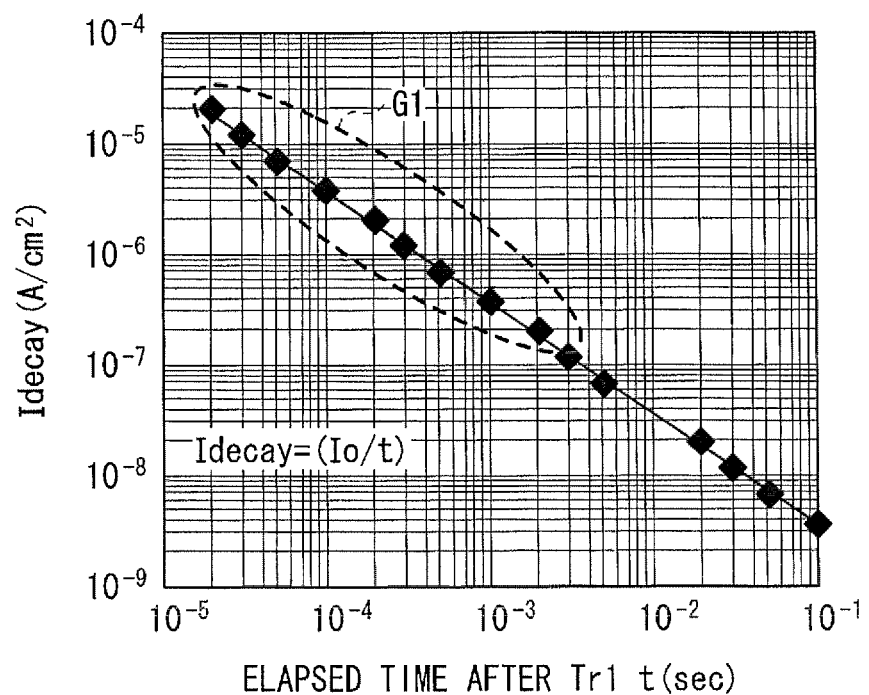
Figure 11B:
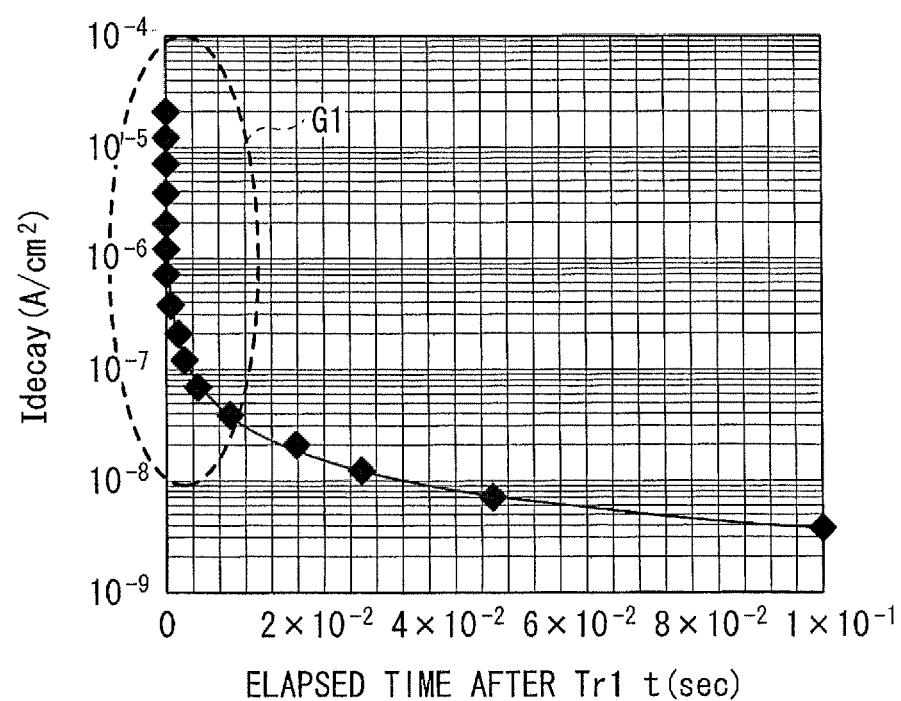

FIGS. 11A and 11B are characteristic diagrams depicting an example of a relationship between an elapsed time after the readout-first reset period and a Decay current.

Figure 12:
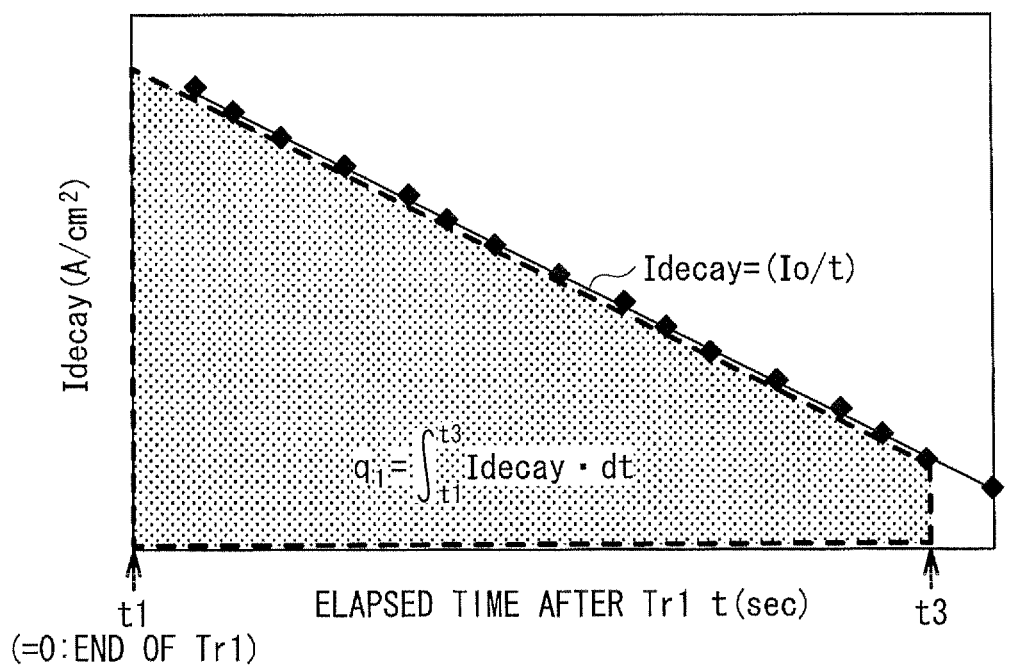

FIG. 12 is a characteristic diagram used to explain a relationship between the amount of residual electric charge and a Decay current.

Figure 13:
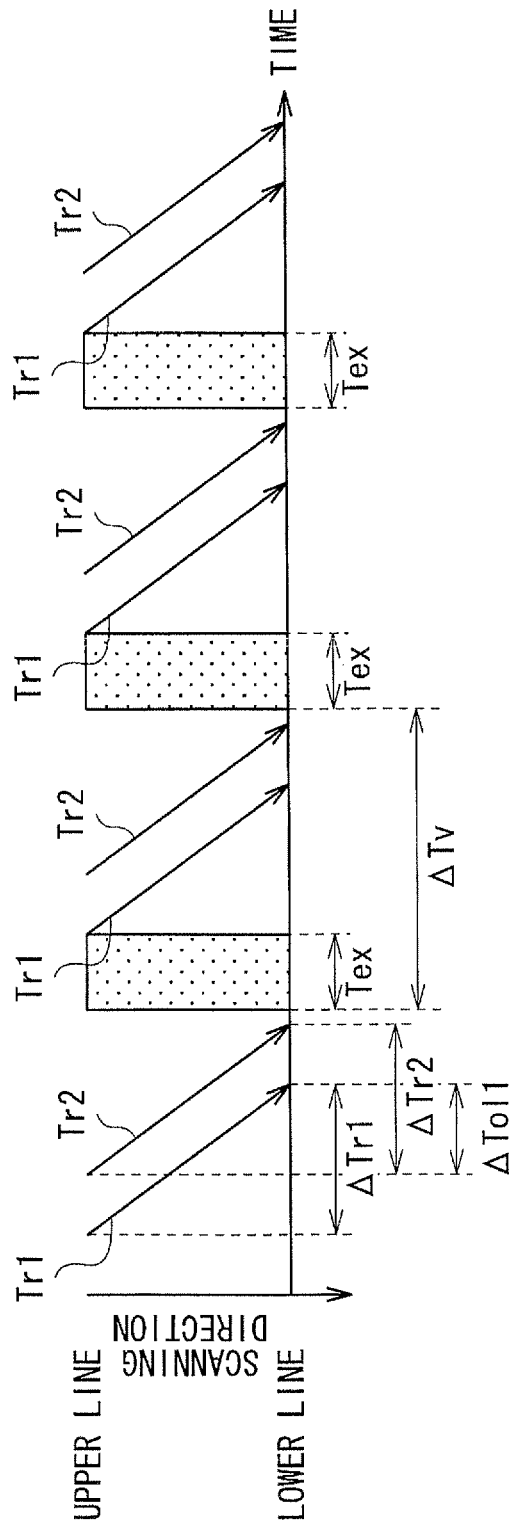

FIG. 13 is a timing chart used to explain an outline of a line-sequential image pickup operation according to an embodiment of the present disclosure.

Figure 14:
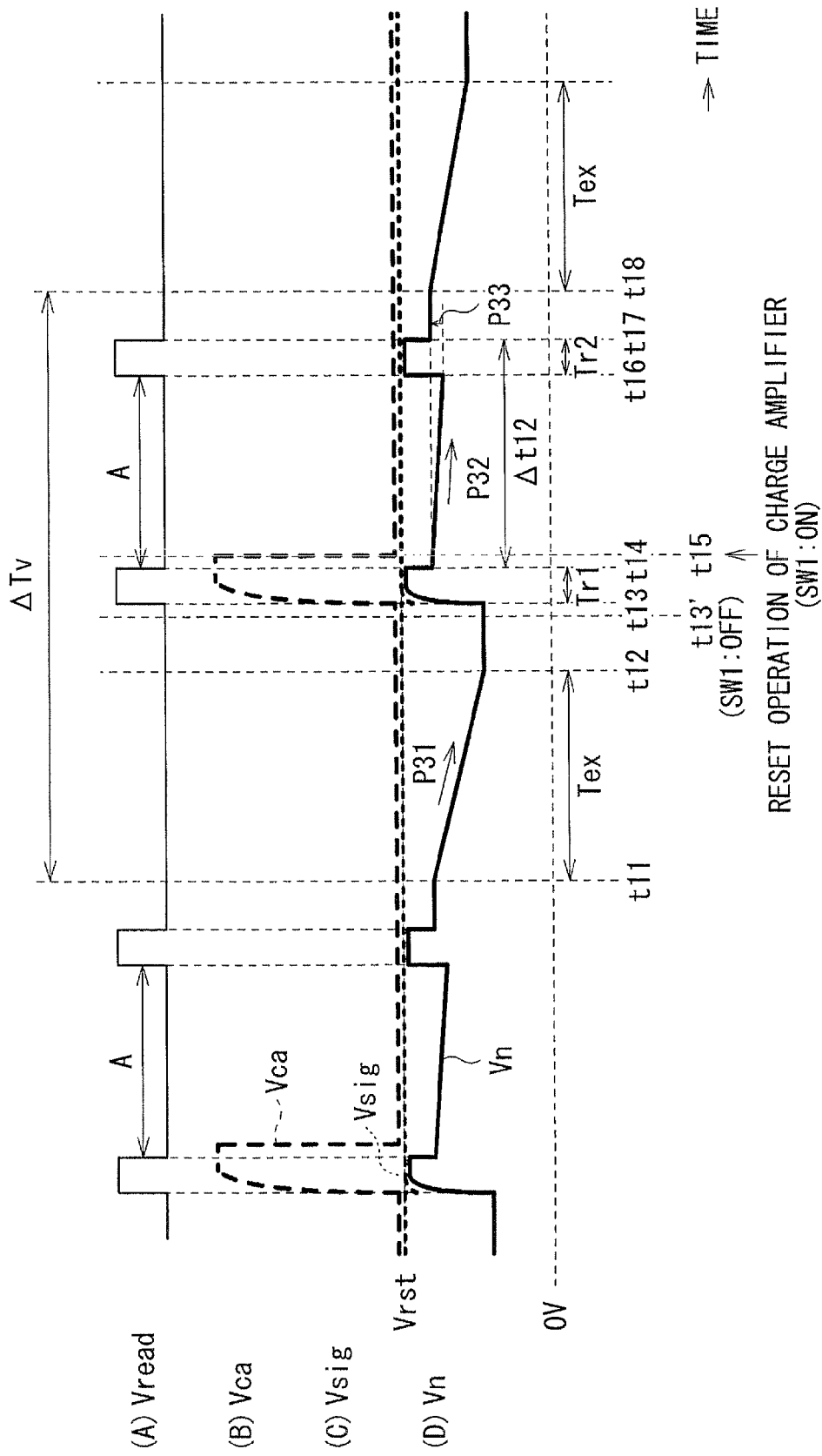

FIG. 14 is a timing waveform chart used to explain an image pickup operation for one line.

Figure 15A:
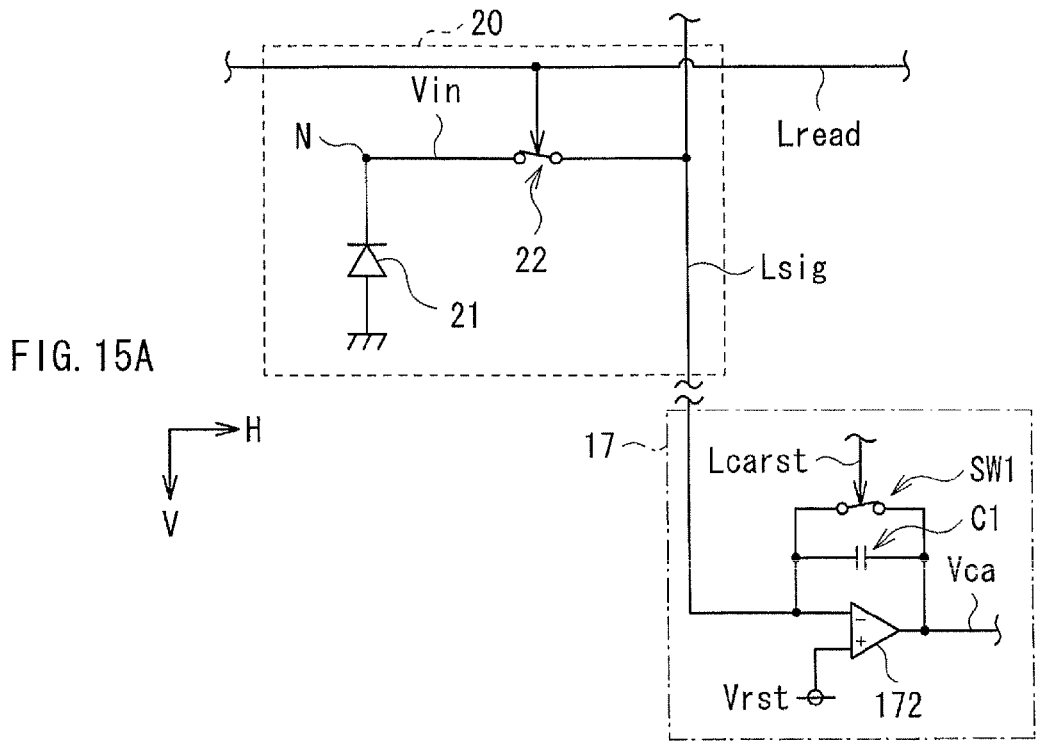
Figure 15B:
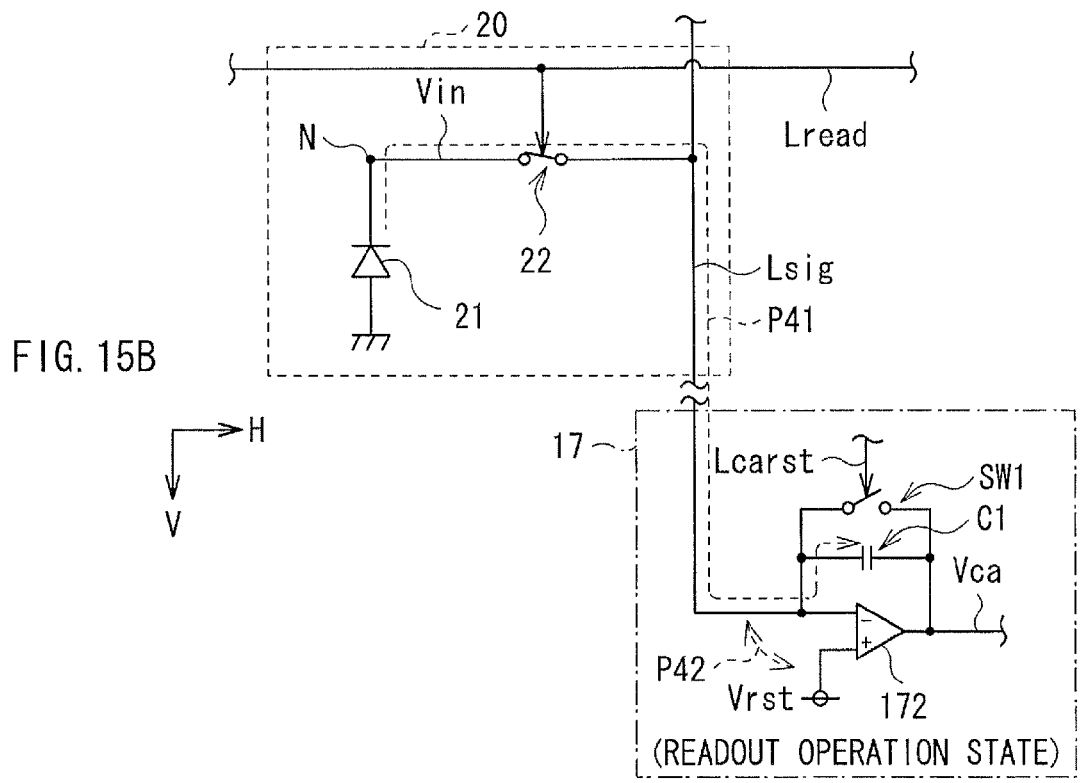

FIGS. 15A and 15B are circuit diagrams depicting an example of an operating state during a second reset period.

Figure 16:
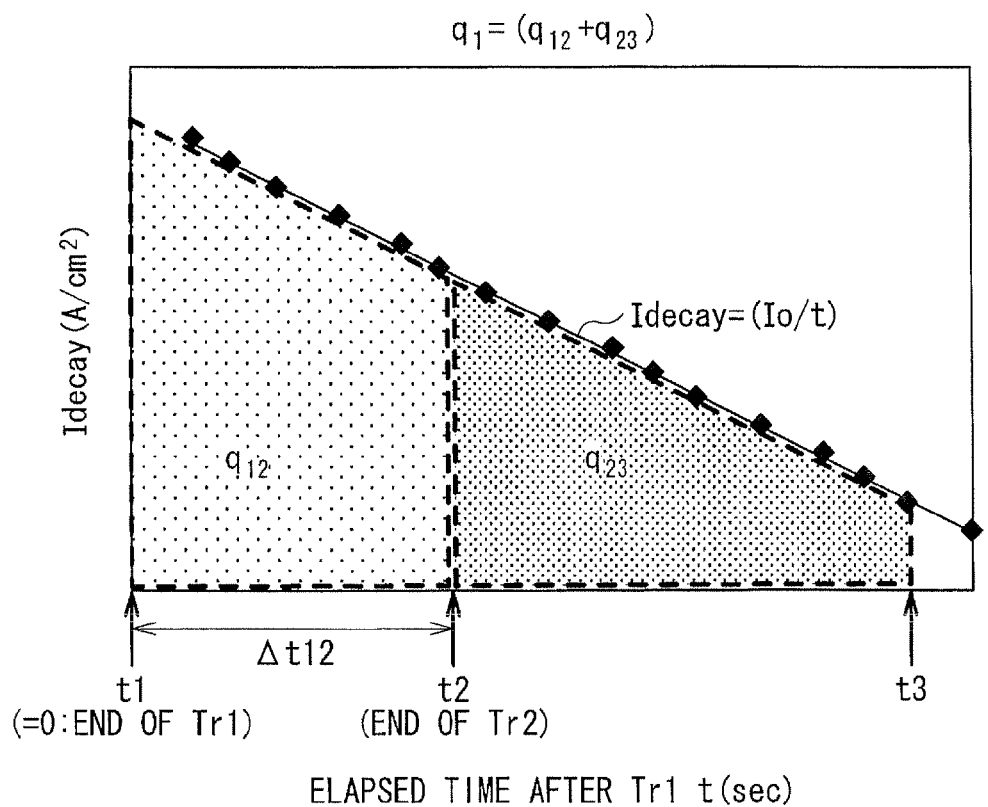

FIG. 16 is a characteristic diagram used to explain the amount of residual electric charge which is decreased by a second reset operation.

Figure 17:
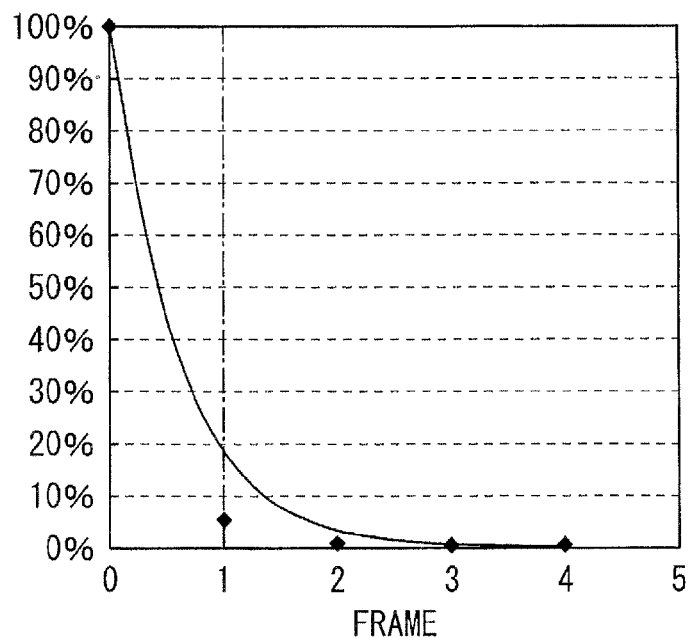

FIG. 17 is a characteristic diagram depicting a change in Decay with time (afterimage characteristics).

Figure 18:
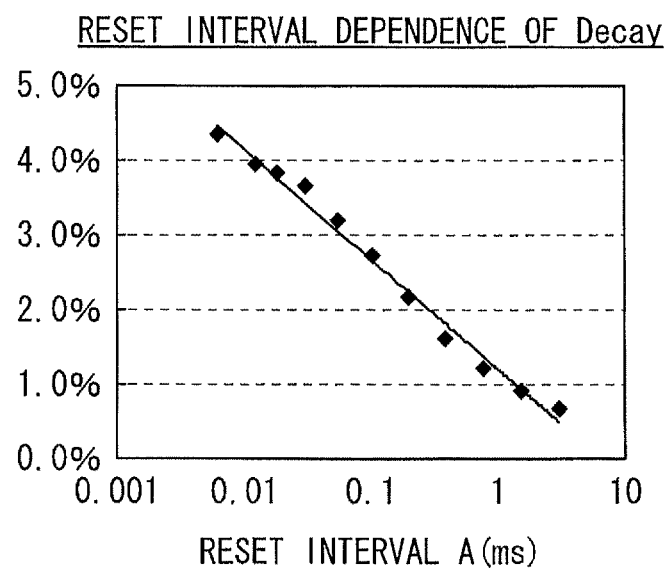

FIG. 18 is a characteristics graph used to explain reset interval dependence of Decay.

Figure 19:
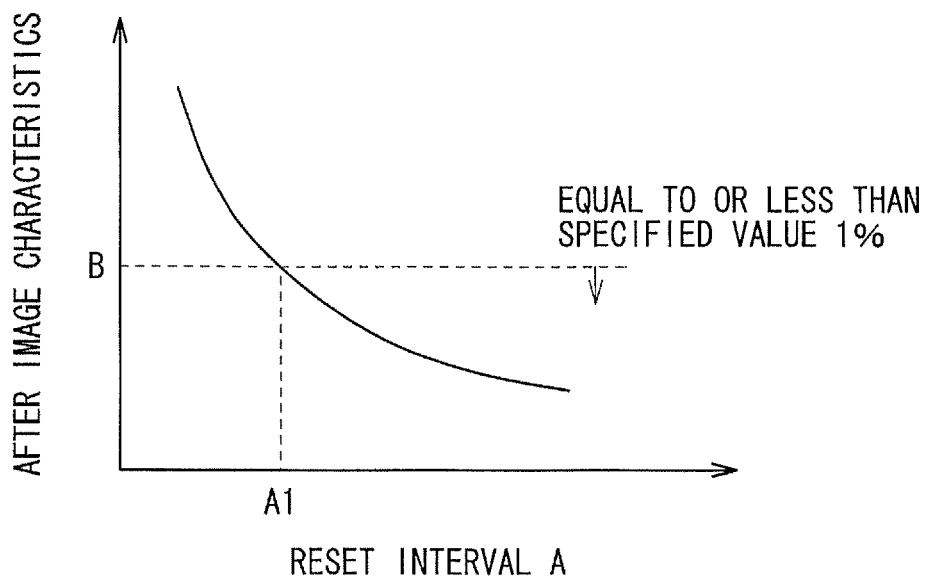

FIG. 19 is a graph depicting a correlation between a reset interval and afterimage characteristics.

Figure 20:
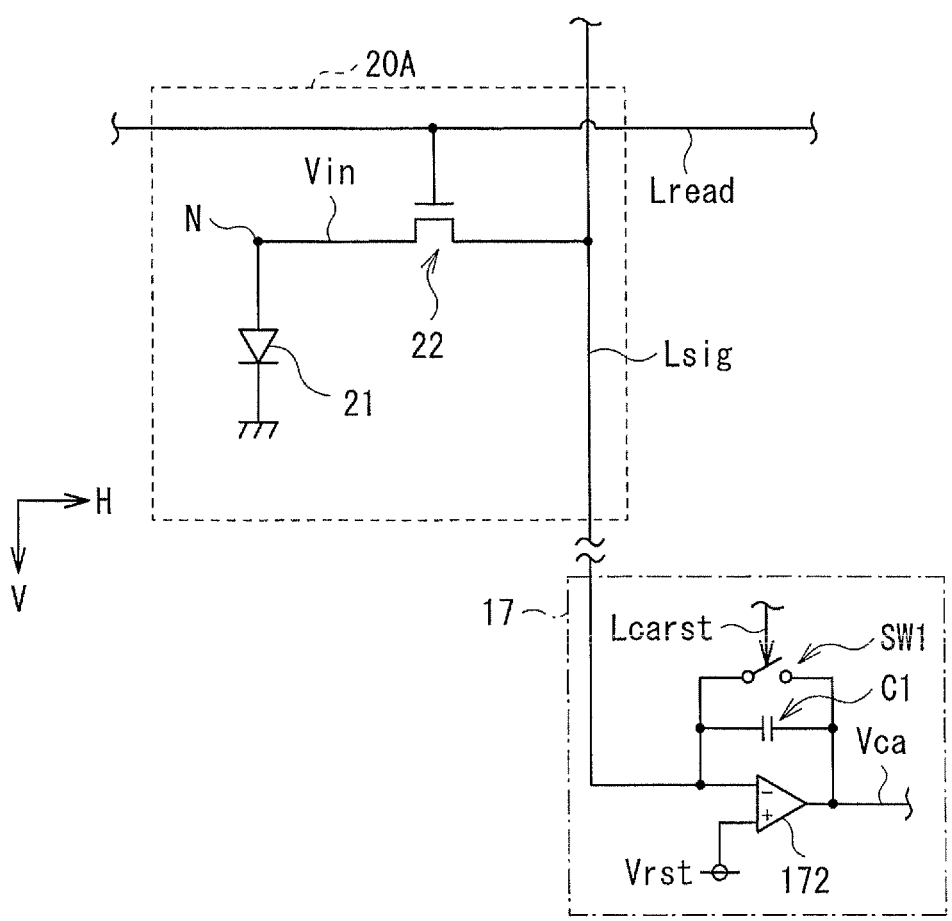

FIG. 20 is a circuit diagram illustrating a configuration of a pixel and the like according to Modification example 1.

Figure 21:
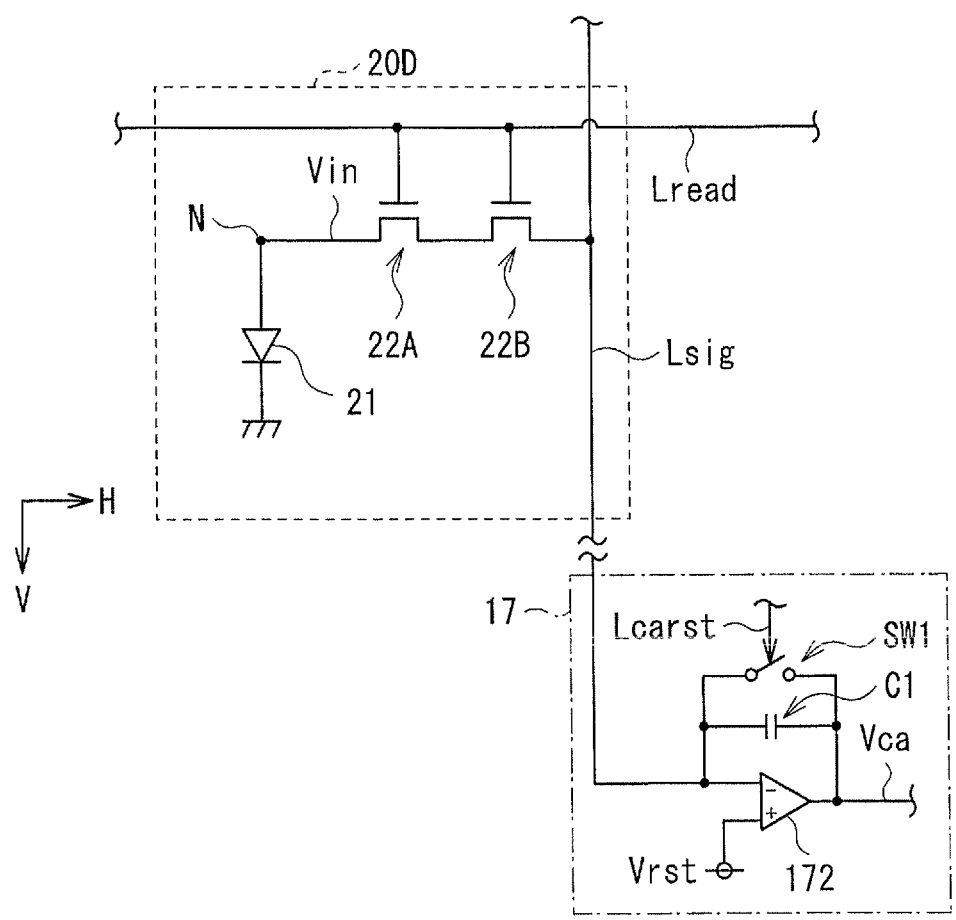

FIG. 21 is a circuit diagram illustrating a configuration of a pixel and the like according to Modification example 2.

Figure 22:
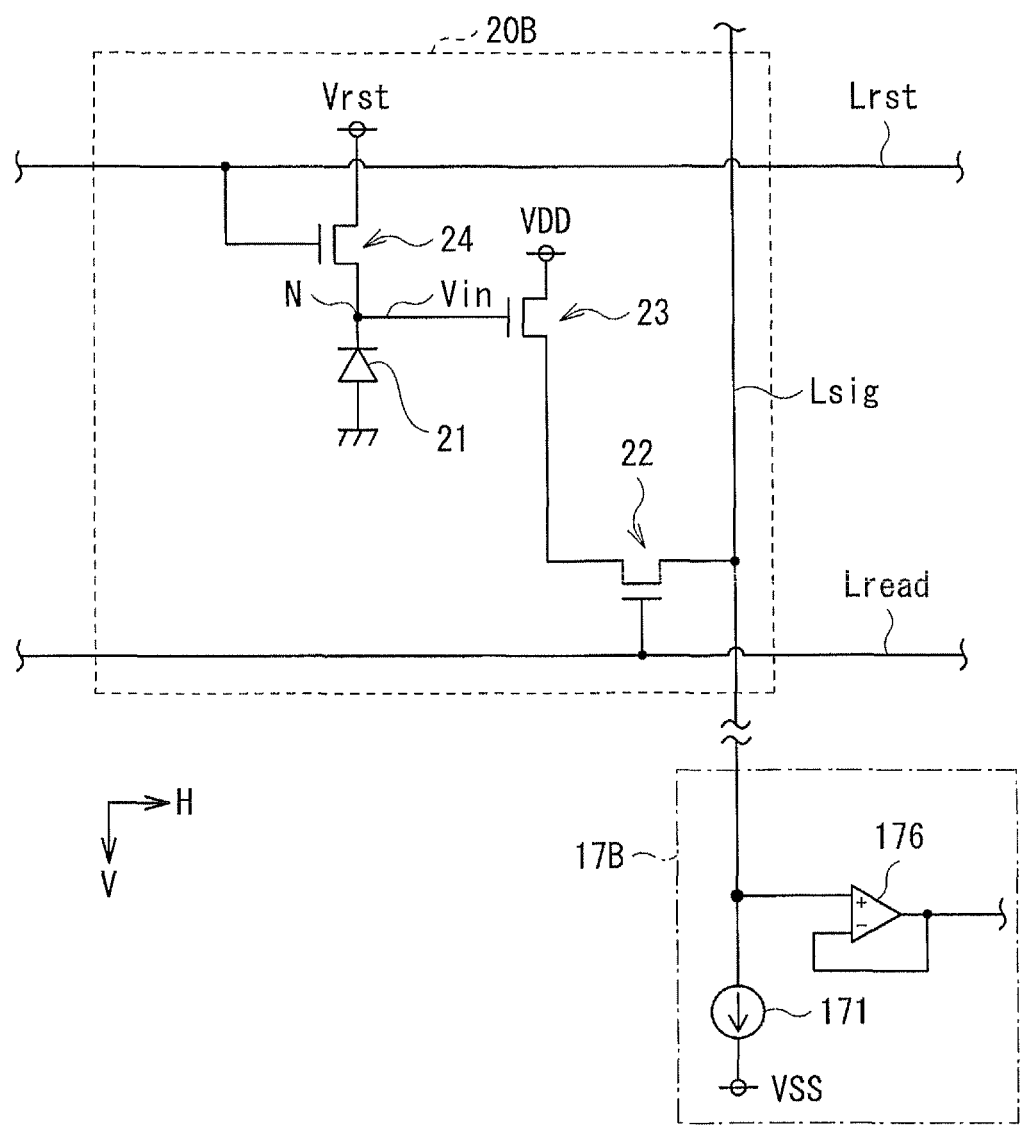

FIG. 22 is a circuit diagram illustrating a configuration of a pixel and the like according to Modification example 3.

Figure 23:
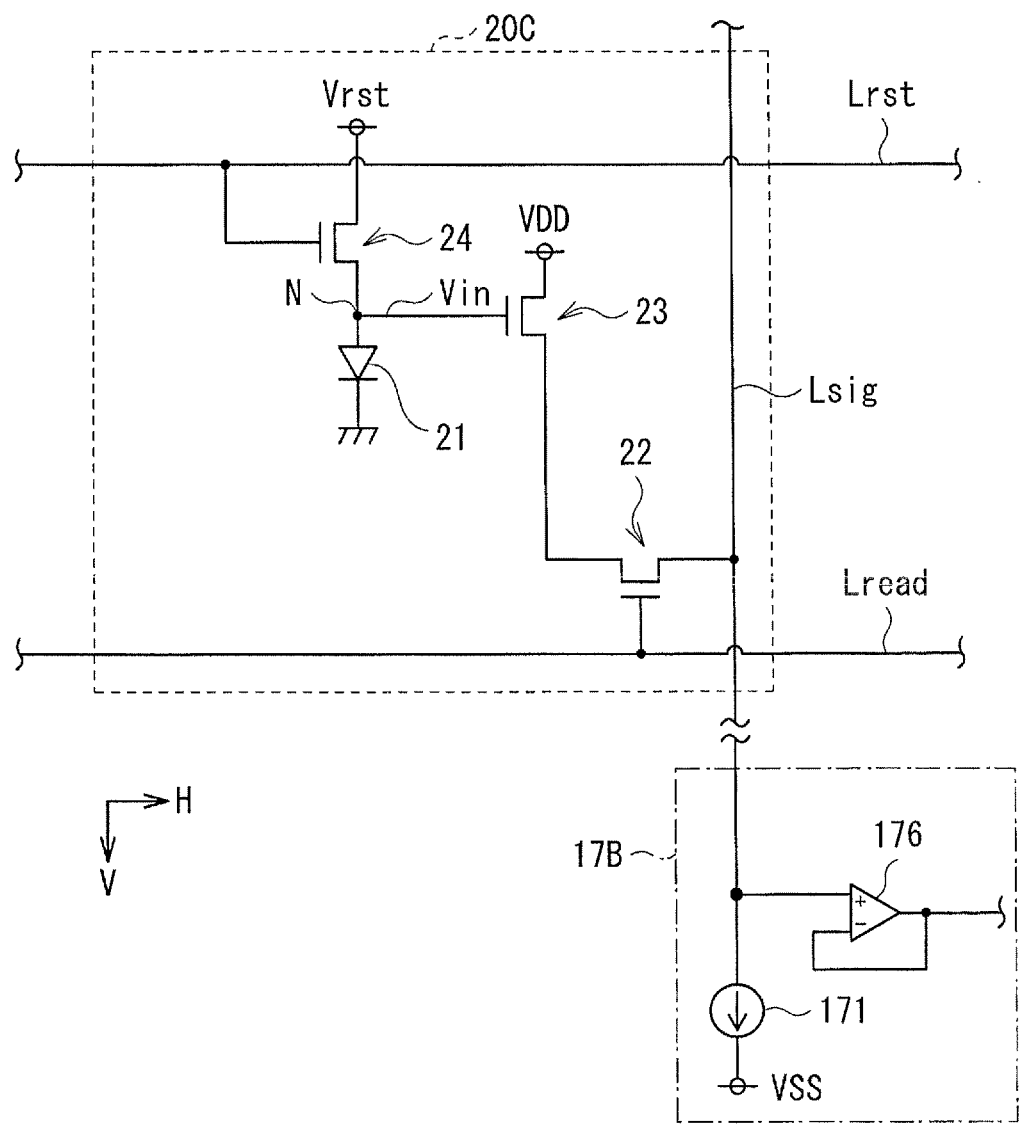

FIG. 23 is a circuit diagram illustrating a configuration of a pixel and the like according to Modification example 4.

Figure 24:
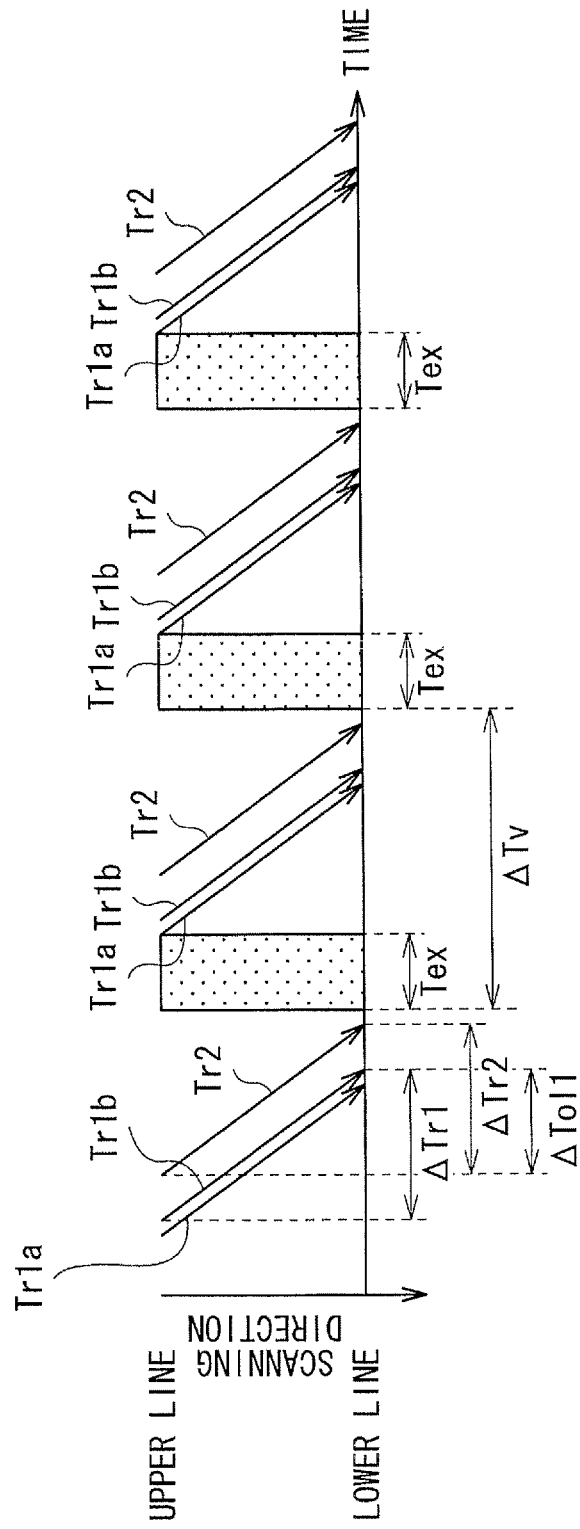

FIG. 24 is a timing chart depicting an example of a line-sequential image pickup operation in an active pixel circuit.

Figure 25A:
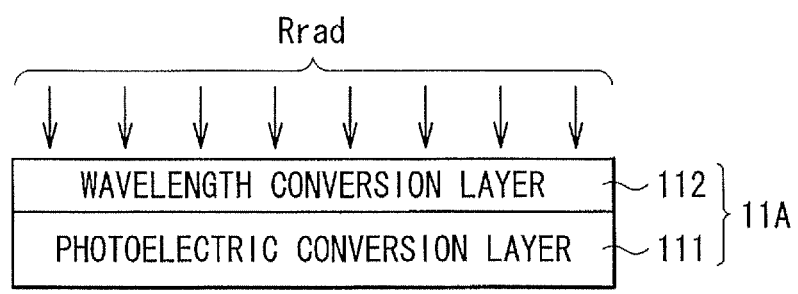
Figure 25B:
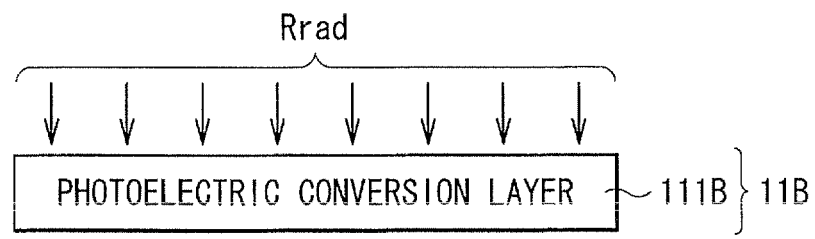

FIGS. 25A and 25B are schematic views illustrating general configurations of image pickup sections according to Modification examples 5 and 6, respectively.

Figure 26:
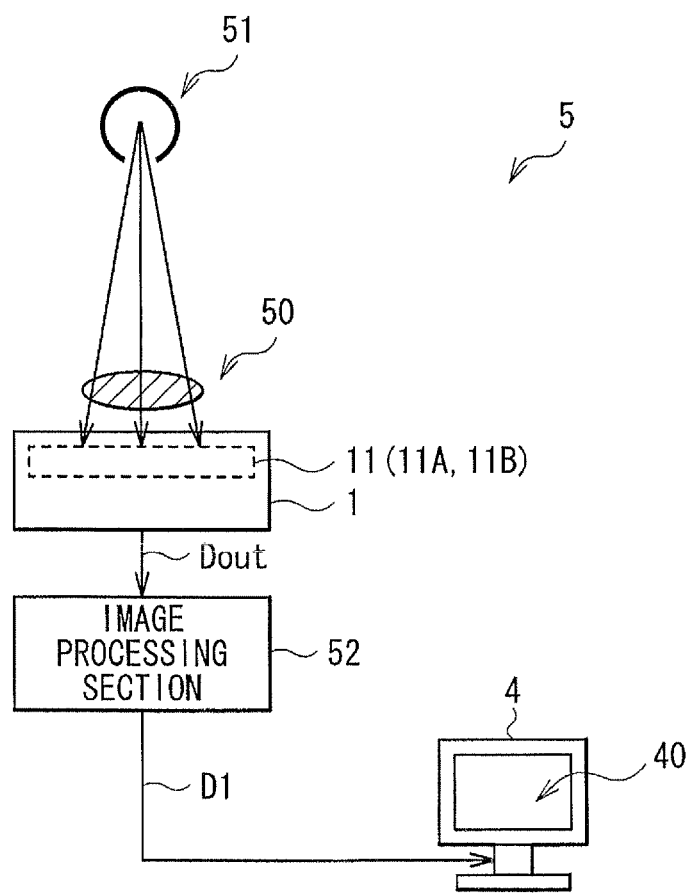

FIG. 26 is a schematic view illustrating a general configuration of an image pickup display system according to an application example.

DETAILED DESCRIPTION

Hereinafter, an embodiment of the present disclosure will be described in detail with reference to the accompanying drawings. Note that descriptions will be given in the following order.
1. Embodiment (an example of an image pickup device in which a reset interval is corrected and reset operation is performed multiple times)
2. Modification example 1 (an another example of a passive pixel circuit)
3. Modification example 2 (still another example of a passive pixel circuit)
4. Modification examples 3 and 4 (examples of an active pixel circuit)
5. Modification example 5 and 6 (examples of an image pickup section that captures an image, on the basis of radiation)
6. Modification example 7 (an example of correcting a reset voltage level)
7. Application example (Application example in which the image pickup device is applied to an image pickup display system)

Embodiment

Overall Configuration of Image Pickup Device 1

Figure 1:
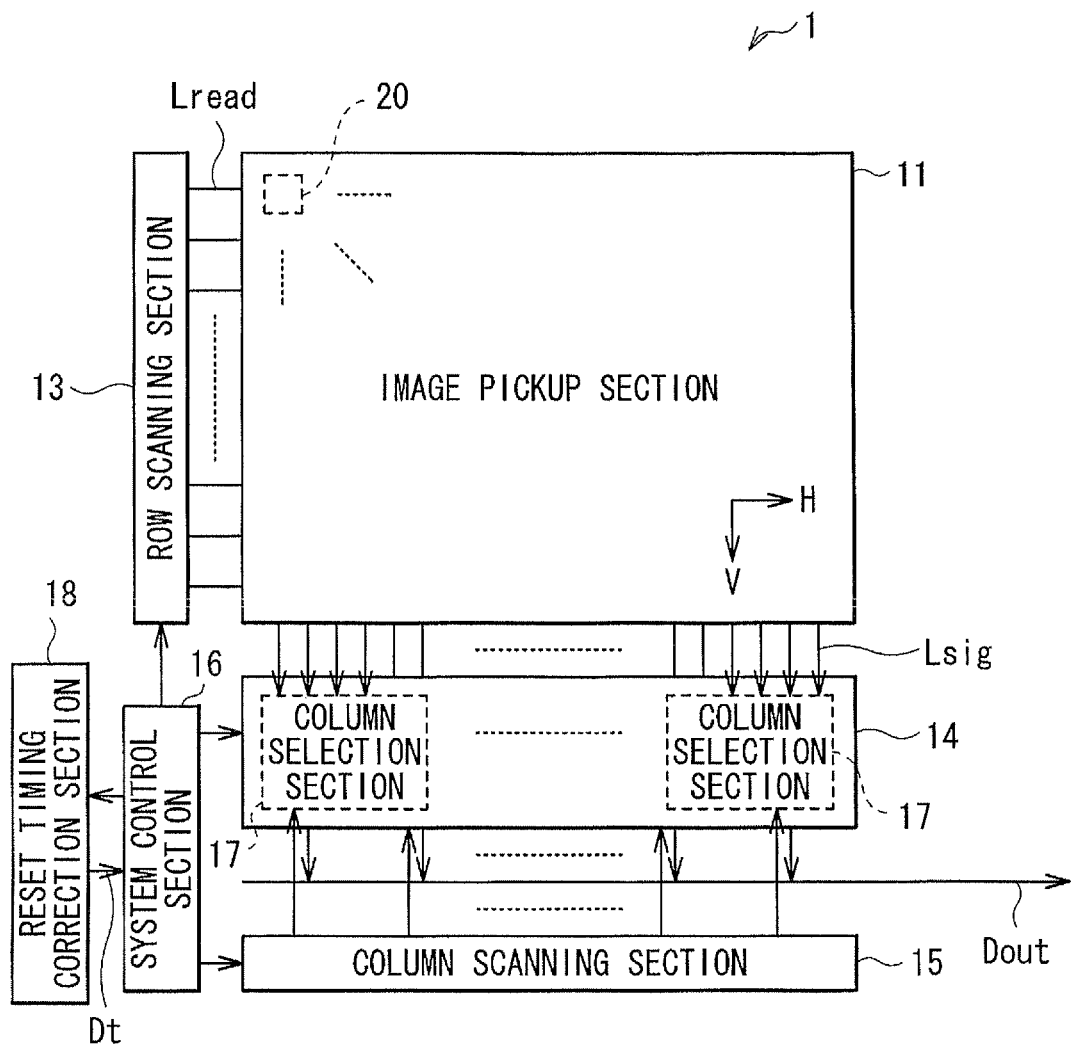
FIG. 1 is a block diagram illustrating an example of an overall configuration of an image pickup device according to an embodiment of the present disclosure.

FIG. 1 illustrates an overall block configuration of an image pickup device (image pickup device 1) according to an embodiment of the present disclosure. The image pickup device 1 reads information on an object (capturing an image of an object), on the basis of incident light (image pickup light). This image pickup device 1 includes an image pickup section 11, a row scanning section 13, an A/D conversion section 14, a column scanning section 15, a system control section 16, and a reset timing correction section 18. Among them, the row scanning section 13, the A/D conversion section 14, the column scanning section 15, and the system control section 16 correspond to a specific but not limitative example of a "drive section" of the present disclosure. In addition, the reset timing correction section 18 corresponds to a specific but not limitative example of a "correction section" of the present disclosure.

(Image Pickup Section 11)

The image pickup section 11 generates an electrical signal in accordance with incident light (image pickup light). In this image pickup section 11, pixels 20 (image pickup pixels or unit pixels) are arranged two-dimensionally in a row direction and in a column direction (in a matrix). Each pixel 20 has a photoelectric conversion element (a later-described photoelectric conversion element 21) that generates photo charge having a charge amount according to the amount of the image pickup light, and accumulates the photo charge therein. Note that in the following description, a horizontal direction (the row direction) in the image pickup section 11 is referred to as an "H direction", and a vertical direction (the column direction) in the image pickup section 11 is referred to as a "V direction", as illustrated in FIG. 1.

Figure 2:
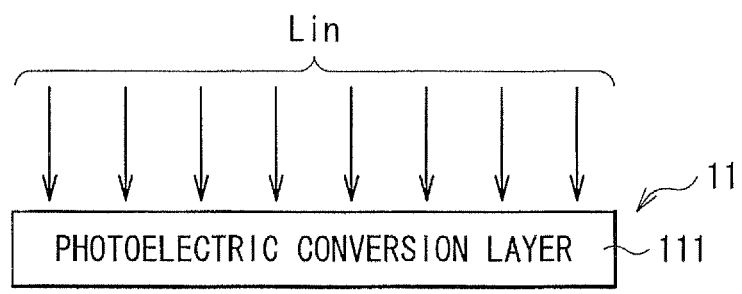
FIG. 2 is a schematic view illustrating an example of a general configuration of an image pickup section illustrated in FIG. 1.

FIG. 2 illustrates an example of a general configuration of the image pickup section 11. The image pickup section 11 has a photoelectric conversion layer 111 in which a photoelectric conversion element 21 is disposed in each pixel 20. As illustrated in FIG. 2, the photoelectric conversion layer 111 is so configured that photoelectric conversion based on incident image pickup light Lin (conversion from the incident image pickup light Lin into signal electric charge) is performed.

Figure 3:
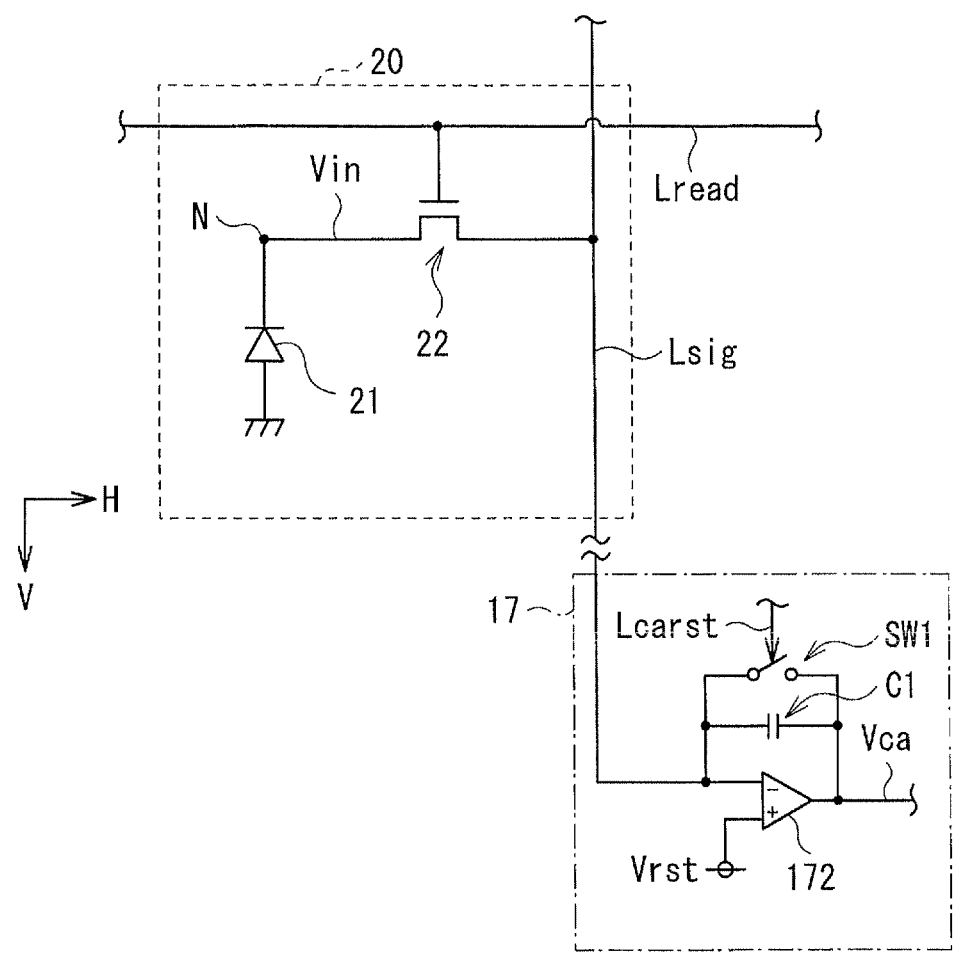
FIG. 3 is a circuit diagram illustrating an example of a detailed configuration of a pixel and the like illustrated in FIG. 1.

FIG. 3 exemplifies a circuit configuration of the pixel 20 (which is a so-called passive circuit configuration) together with a circuit configuration of a column selection section 17 described later in the A/D conversion section 14. This passive pixel 20 is provided with one photoelectric conversion element 21 and one transistor 22. Further, the pixel 20 is connected to a readout control line Lread and a signal line Lsig that extend in the H and V directions, respectively.

The photoelectric conversion element 21 may be, but is not limited to, a positive intrinsic negative (PIN) photodiode or a metal-insulator-semiconductor (MIS) sensor. The photoelectric conversion element 21 is configured to generate signal electric charges whose charge amount is according to the amount of the incident light (image pickup light Lin), as described above. Note that a cathode of the photoelectric conversion element 21 is connected to an accumulation node N in this example.

The transistor 22 is a transistor (reading transistor) that is turned ON in accordance with a row scanning signal to be supplied from the readout control line Lread, then outputting a signal electric charge (input voltage Vin) obtained from the photoelectric conversion element 21 to the signal line Lsig. In this example, the transistor 22 is configured of an N-channel type (N type) field effect transistor (FET). However, the transistor 22 may also be configured of, for example, a P-channel type (P type) FET instead. Furthermore, the transistor 22 may be configured of a silicon-based semiconductor made of, for example, amorphous silicon, microcrystal silicon, polysilicon, or the like. Alternatively, the transistor 22 may be configured of an oxide semiconductor made of, for example, indium gallium zinc oxide (InGaZnO), zinc oxide (ZnO), or the like.

In the pixel 20, a gate of the transistor 22 is connected to the readout control line Lread; a source thereof is connected to, for example, the signal line Lsig; and a drain thereof is connected to, for example, a cathode of the photoelectric conversion element 21 through the accumulation node N. In addition, an anode of the photoelectric conversion element 21 is connected to the ground (is grounded).

(Row Scanning Section 13)

The row scanning section 13 includes shift register circuits, predetermined logic circuits, and the like, as will be described later. In addition, the row scanning section 13 serves as a pixel drive section (a row scanning circuit) that drives the pixels 20 (performs line-sequential scanning) in the image pickup section 11 for each row (each horizontal line). Specifically, the row scanning section 13 performs the line-sequential scanning image pickup operations such as a reading operation and a reset operation (described later), for example, by the line-sequential scanning. Note that this line-sequential scanning is performed by supplying the above-described row scanning signal to each pixel 20 through the readout control lines Lread.

Figure 4:
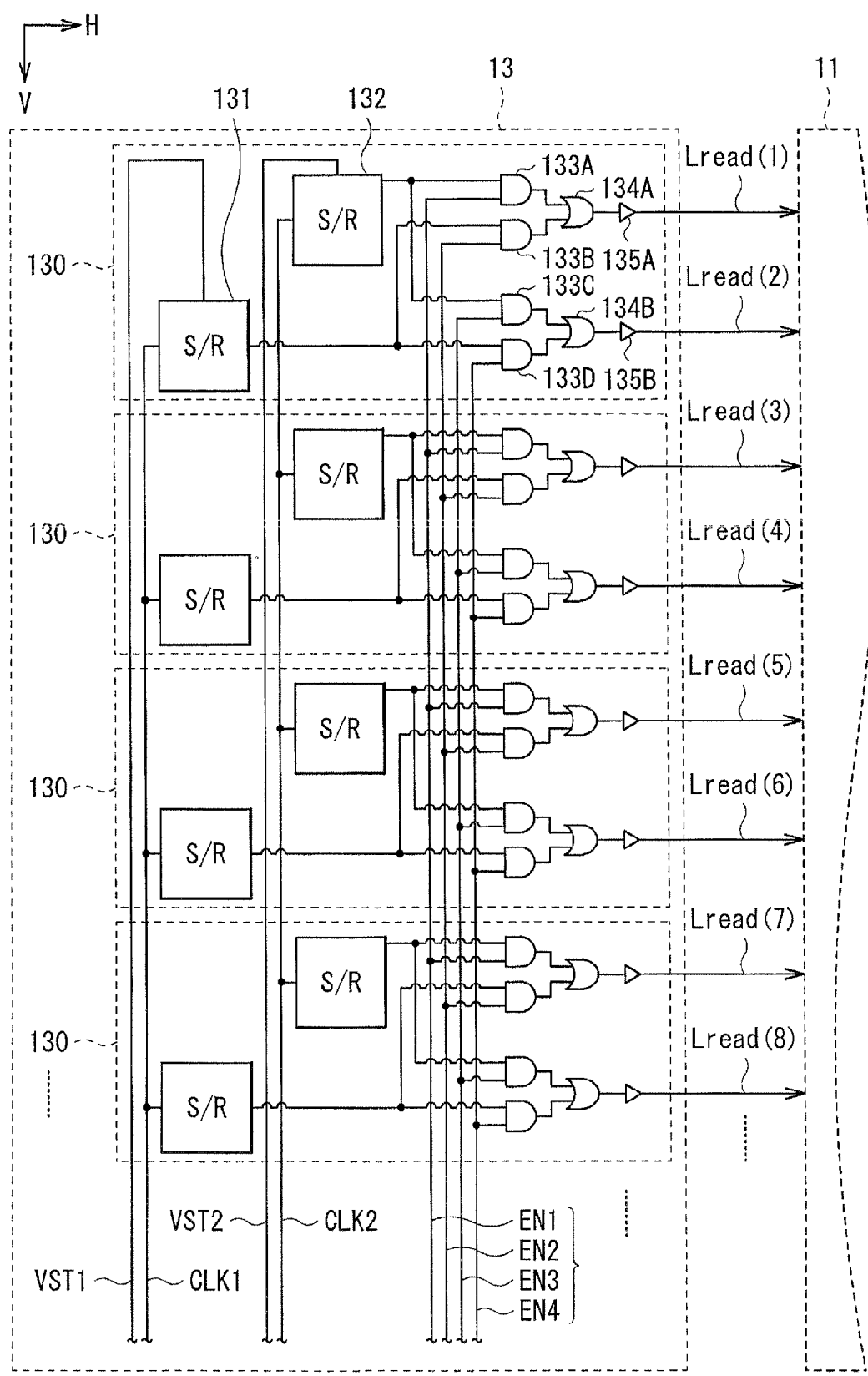
FIG. 4 is a block diagram illustrating an example of a detailed configuration of a row scanning section illustrated in FIG. 1.

FIG. 4 illustrates an example of a block configuration of the row scanning section 13. This row scanning section 13 includes a plurality of unit circuits 130 that are arranged in the V direction. Note that eight readout control lines Lread that are connected to four unit circuits 130 shown in FIG. 4 are indicated by Lread (1) to Lread (8) in this order from the top.

Each unit circuit 130 includes a plurality of ("two" in this embodiment) columns of shift register circuits 131 and 132 (indicated by "S/R" for convenience's sake in the block in FIG. 4, the same is applicable hereinafter), four AND (logical multiply) circuits 133A to 133D, two OR (logical sum) circuits 134A and 134B, and two buffer circuits 135A and 135B.

The shift register circuits 131 generate, as the plurality of unit circuits 130 as a whole, pulse signals that shift sequentially in the V direction based on start pulses VST1 and clock signals CLK1 supplied from the system control section 16. Likewise, the shift register circuits 132 generate, as the plurality of unit circuits 130 as a whole, pulse signals that shift sequentially in the V direction, based on start pulses VST2 and clock signals CLK2 supplied from the system control section 16. These shift register circuits 131 and 132 are provided corresponding to the number of times (for example, twice) that reset operation (described later) is performed (two columns of shift register circuits are provided corresponding to the number of the reset operation to be performed). Specifically, for example', the shift register circuit 131 is has a role of generating a pulse signal for the first reset operation, whereas the shift register circuit 132 has a role of generating a pulse signal for the second reset operation.

The AND circuits 133A to 133D receive four enable signals EN1 to EN4, respectively, to control (specify) the effective periods of the pulse signals (output signals) output from the shift register circuits 131 and 132. In further detail, the AND circuit 133A receives a pulse signal from the shift register circuit 132 at one input terminal thereof, and the enable signal EN1 at the other input terminal thereof. The AND circuit 133B receives a pulse signal from the shift register circuit 131 at one input terminal thereof, and the enable signal EN2 at the other input terminal thereof. The AND circuit 133C receives a pulse signal from the shift register circuit 132 at one input terminal thereof, and the enable signal EN3 at the other input terminal thereof. The AND circuit 133D receives a pulse signal from the shift register circuit 131 at one input terminal thereof, and the enable signal EN4 at the other input terminal thereof.

The OR circuit 134A is a circuit that generates a logical sum signal (OR signal) of output signals from the AND circuits 133A and 133B. Likewise, the OR circuit 134B is a circuit that generates an OR signal of output signals from the AND circuits 133C and 133D. The AND circuits 133A to 133D and the OR circuits 134A and 134B described above generate the OR signal of the output signals (pulse signals) from the shift register circuits 131 and 132 while controlling the effective period of the output signals. This specifies the timing and the like of reset operation (described later) that is performed multiple times.

The buffer circuit 135A is a circuit that functions as a buffer for an output signal from the OR circuit 134A. The buffer circuit 135B is a circuit that functions as a buffer for an output signal (pulse signal) from the OR circuit 134B. The pulse signals (row scanning signals) buffered by the buffer circuits 135A and 135B are supplied to the pixels 20 in the image pickup section 11 through the readout control lines Lread.

(A/D Conversion Section 14)

The A/D conversion section 14 has a plurality of column selection sections 17, each of which is provided for a plurality of (four, in this example) signal lines Lsig. In addition, the A/D conversion section 14 performs an A/D (analog-to-digital) conversion based on signal voltages (signal electric charges) received through the signal lines Lsig. Through this, the A/D conversion section 14 generates output data Dout (image pickup signal) which is configured of a digital signal, then outputting the output data Dout to the outside.

Figure 5:
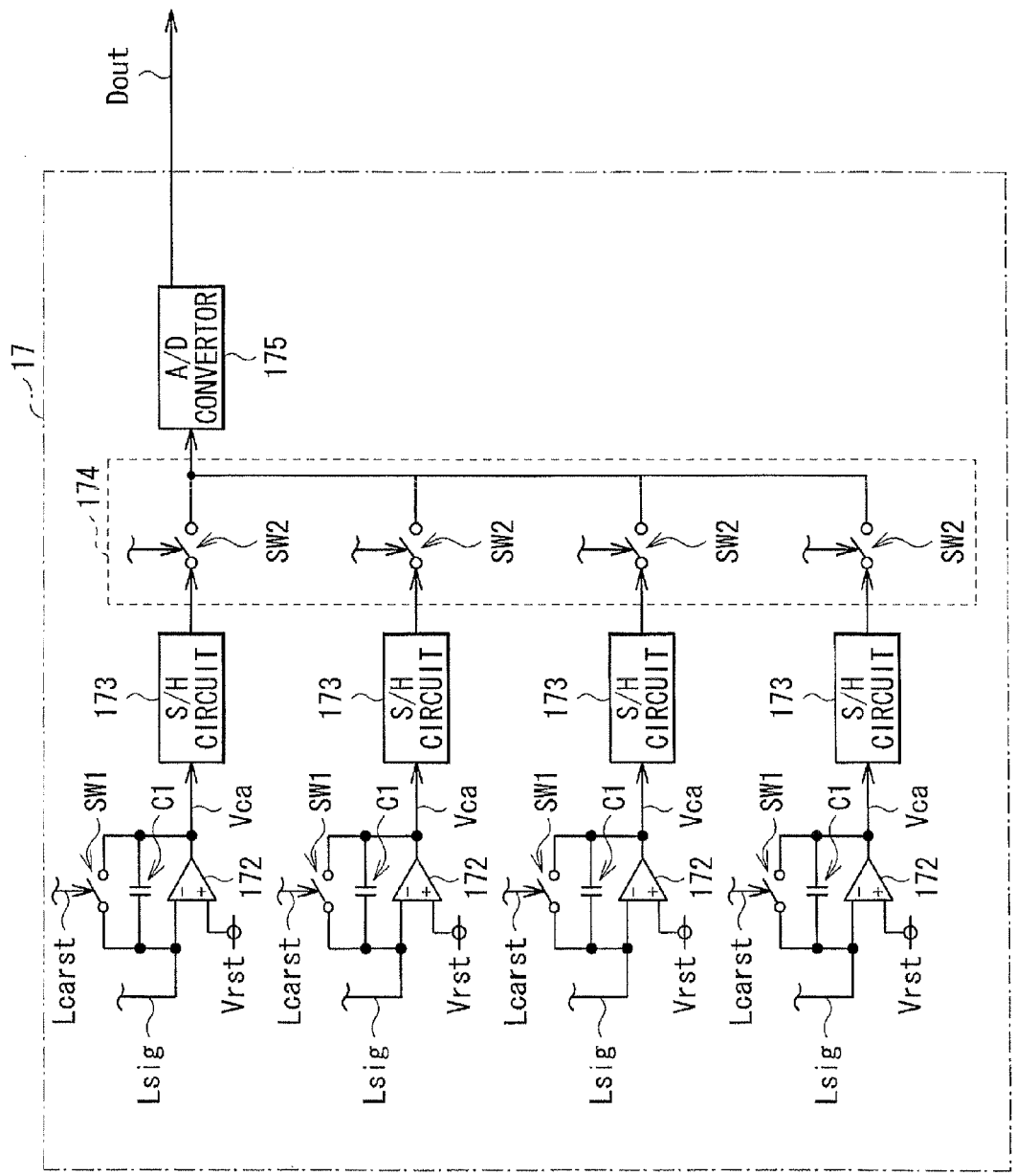
FIG. 5 is a block diagram illustrating an example of a detailed configuration of a column selection section illustrated in FIG. 1.

As illustrated in FIGS. 3 and 5, for example, each column selection section 17 includes a charge amplifier 172, a capacitative element (a capacitor or a feedback capacitative element) C1, a switches SW1, a sample hold (S/H) circuit 173, a multiplexer circuit (selection circuit) 174 having four switches SW2, and an A/D convertor 175. Among these, each of the charge amplifier 172, the capacitative element C1, the switch SW1, the S/H circuit 173, and the switch SW2 is provided for each signal line Lsig. Each of the multiplexer circuit 174 and the A/D convertor 175 is provided for each column selection section 17.

The charge amplifier 172 is an amplifier that converts the signal electric charge having been read from the signal line Lsig into a voltage (Q-V conversion). The charge amplifier 172 has a negative (−) input terminal connected to one end of the signal line Lsig, and a positive (+) input terminal to which a predetermined reset voltage Vrst is applied. In this charge amplifier 172, the output terminal is feedback-connected to the negative input terminal through the circuit configured of the capacitative element C1 and the switch SW1 connected in parallel to each other. In more detail, one terminal of the capacitative element C1 is connected to the negative input terminal of the charge amplifier 172, whereas the other terminal of the capacitative element C1 is connected to the output terminal of the charge amplifier 172. Likewise, one terminal of the switch SW1 is connected to the negative input terminal of the charge amplifier 172, whereas the other terminal of the switch SW1 is connected to the output terminal of the charge amplifier 172. Note that the ON and OFF states of the switch SW1 is controlled by a control signal (amplifier reset control signal) that is to be supplied from the system control section 16 through an amplifier reset control line Lcarst.

The S/H circuit 173 is arranged between the charge amplifier 172 and the multiplexer circuit 174 (switches SW2). The S/H circuit 173 is a circuit that temporally holds an output voltage yea of the charge amplifier 172.

The multiplexer circuit 174 is a circuit that selectively connects each S/H circuit 173 to the A/D convertor 175 or disconnects each S/H circuit 173 from the A/D convertor 175, by sequentially turning ON one of the four switches SW2 in accordance with the scanning driving of the column scanning section 15.

The A/D convertor 175 is a circuit that generates output data Dout described above by performing A/D conversion on the output voltage supplied from the S/H circuit 173 through the switches SW2, then outputting the output data Dout.

(Column Scanning Section 15)

The column scanning section 15 includes, for example, a shift register, an address recorder, and the like, and sequentially drives the switches SW2 in the column selection section 17 while scanning the switches SW2. With this above selective scanning by the column scanning section 15, signals (output data Dout) of the pixels 20 which have been read from the signal lines Lsig are sequentially output to the outside.

(Reset Timing Correction Section 18)

The reset timing correction section 18 stores a correlation (for example, lookup table (LUT)) between a reset interval (reset interval A described later) and afterimage characteristics in advance. This reset timing correction section 18 is a process section that corrects (adjusts) a reset timing (reset interval), on the basis of the correlation. As will be described later, a so-called Decay phenomenon (a phenomenon that electric charge is discharged after readout, and the amount of the electric charge being discharged is decreased with time, as will be described later) occurs in the photoelectric conversion elements 21 of the pixels 20 in the image pickup section 11, and thereby an afterimage would appear in a picked-up image. The temporal variation (afterimage or Decay characteristics) in the amount of electric charge (residual electric charge amount) accumulated at the accumulation node N, which is caused by the Decay phenomenon, varies depending on a photoelectric conversion material for use in the photoelectric conversion elements 21 and the like. In other words, this temporal variation is unique to the configuration of the image pickup section 11. Therefore, the afterimage characteristics of the image pickup section 11 are measured in advance, and this measurement result is stored as the lookup table. Note that the term "afterimage" in this embodiment refers to an image that is different from that of an actual object and is created on the basis of signal electric charges accumulated before the actual time of image pickup (exposure period). This afterimage may become noise components in the output data Dout.

In order to create the lookup table, for example, successive frames in time sequence are actually output, and the following procedures are performed based on this output. In other words, while a time interval between a reset operation upon reading a signal electric charge in a certain frame (first reset operation, described later) and a second reset operation described later is varied, the amount of the residual electric charges in the next frame is measured. A characteristic diagram is created by plotting the measured result (or a characteristic diagram with use of approximate curve thereof), and then, this characteristic diagram is stored as the lookup table that shows a correlation between the above-described reset interval and afterimage characteristics. When correcting a reset timing, first, the reset timing correction section 18 selects (determines) a value of a reset interval A, which allows an afterimage specified value to be equal to or less than a desired value (for example, 1%), on the basis of the lookup table that has been created and stored in advance in the above manner. Following this, the reset timing correction section 18 corrects (adjusts) a reset timing (second reset timing) in accordance with the selected value of the reset interval A. Correction data Dt concerning the reset timing which has been obtained in the above manner is output to the system control section 16, and applies reset operation of each pixel 20 is performed based on the inputted corrected reset timing.

The above correction operation performed by the reset timing correction section 18 is based on a control signal to be supplied from the system control section 16. In addition, this correction operation is performed automatically or manually (on the basis of an external input signal to be supplied from an external input section (not illustrated)), for example, before the image pickup device is activated, before a moving image is shot, or the like.

(System Control Section 16)

The system control section 16 controls the operations of the row scanning section 13, the A/D conversion section 14, the column scanning section 15, and the reset timing correction section 18. In more detail, the system control section 16 has a timing generator that generates the above-described various timing signals (control signals), and controls the drivings of the row scanning section 13, the A/D conversion section 14, and the column scanning section 15, on the basis of the various timing signals generated by the timing generator. Although the detail thereof will be described later, as a timing signal for reset operation, a timing signal based on the reset timing that is corrected to allow the reset interval to be appropriate, on the basis of the correction data output from the reset timing correction section 18. Based on the control of the system control section 16, the row scanning section 13, the A/D conversion section 14, and the column scanning section 15 perform image pickup driving (line-sequential image pickup driving) on the pixels 20 in the image pickup section 11, and thereby the output data Dout is acquired from the image pickup section 11.

(Function and Effect of Image Pickup Device 1)

In the image pickup device 1 according to this embodiment, when image pickup light Lin enters the image pickup section 11, the photoelectric conversion element 21 in each pixel 20 converts the image pickup light Lin into a signal electric charge (photoelectric conversion). At this time, a voltage at the accumulation node N is changed depending on the node capacitance, due to the accumulation of the signal electric charge having been generated as a result of the photoelectric conversion. Specifically, the voltage at the accumulation node N is changed (decreased in this case) by $q/Cs$, where Cs denotes the value of a accumulation node capacitance and q denotes the generated signal electric charges. In response to this voltage change, an input voltage Vin (that corresponds to the signal electric charges) is applied to the drain of the transistor 22. When the transistor 22 is turned ON in response to a row scanning signal supplied from the readout control line Lread, the input voltage Vin (the signal electric charge accumulated at the accumulation node N) applied to the transistor 22 is read out to the signal line Lsig.

The readout signal electric charges are input to the column selection section 17 in the A/D conversion section 14 through the signal lines Lsig, for each of the plurality of (four, in this example) pixel columns. In the column selection section 17, the charge amplifier circuits configured of a charge amplifier 172 and the like performs a Q-V conversion (conversion of signal electric charges into signal voltages) on the signal electric charges received from each of the signal lines Lsig. Following this, the A/D convertor 175 performs an A/D conversion on the Q-V converted signal voltages (the output voltages Vca from the charge amplifier 172) t through the S/H circuit 173 and the multiplexer circuit 174. As a result, output data Dout (image pickup signal) configured of digital signals is generated. Through this, the column selection section 17 sequentially output the output data Dout, and then, the output data Dout is transmitted to the outside (or is input to an internal memory (not illustrated)). Next, a description will be given in detail, of each step constituting this image pickup operation.

(Operation During Exposure and Readout Periods)

Figure 6A:
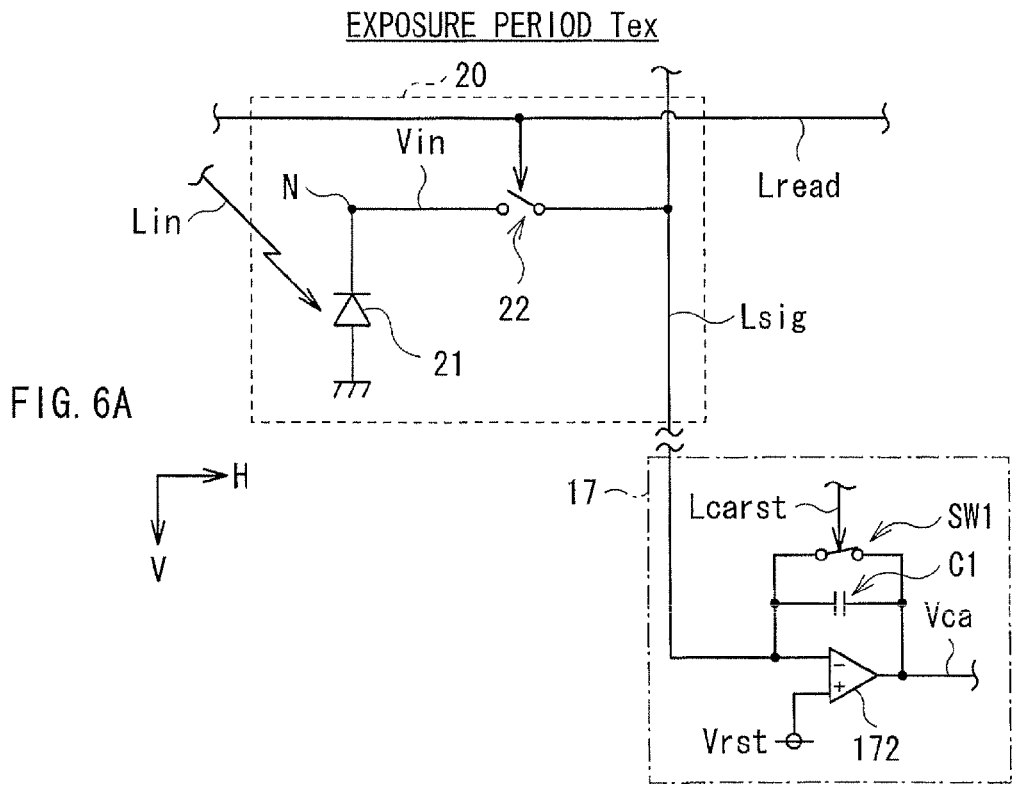
FIGS. 6A and 6B are circuit diagrams depicting an example of an operating state during an exposure period, and an example of an operating state during a readout-first reset period, respectively.
Figure 6B:
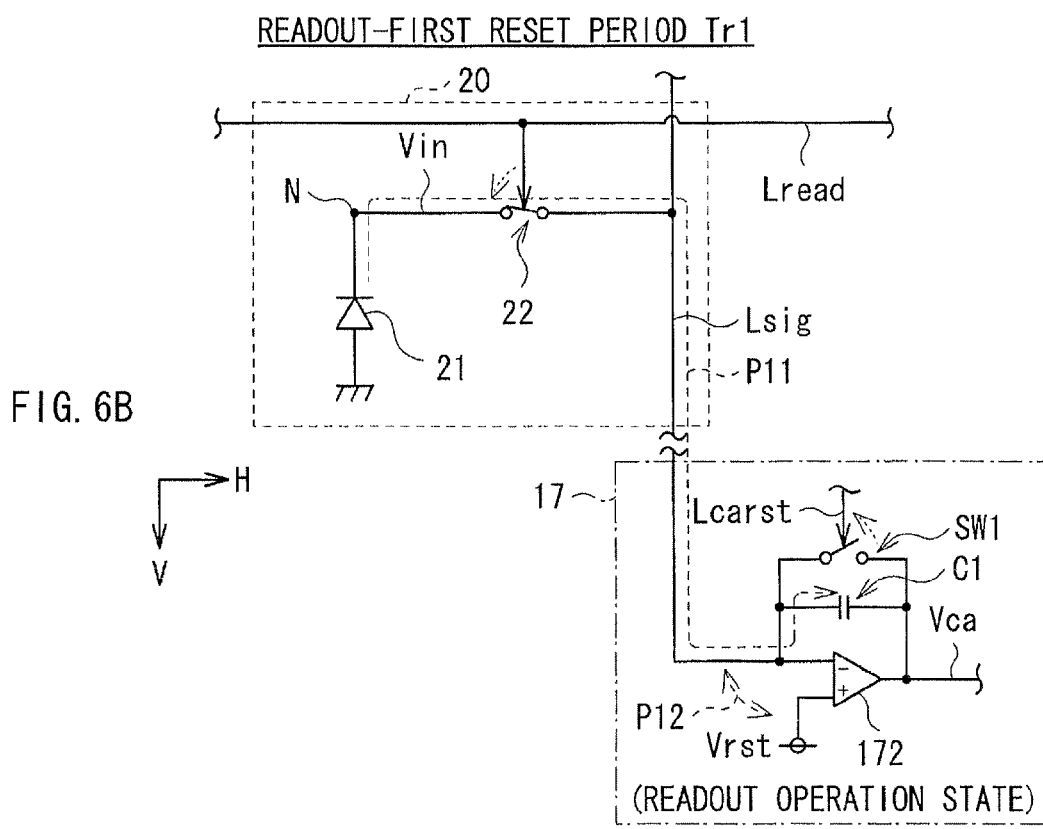

FIGS. 6A and 6B illustrate an example of an operation of the pixel 20 and the charge amplifier circuit in the column selection section 17 during the exposure period and the readout period, respectively. Note that the ON and OFF states of the transistor 22 is expressed by a switch, for convenience's sake.

First, the transistor 22 is in an OFF state during the exposure period Tex, as illustrated in FIG. 6A. In this state, the signal electric charge based on the image pickup light Lin that has entered the photoelectric conversion element 21 in the pixel 20 is accumulated at the accumulation node N, and is not output (not readout) toward the signal line Lsig. Meanwhile, the charge amplifier circuit is in a state where an amplifier reset operation (a reset operation of the charge amplifier circuit) described later has been performed. Accordingly, the switch SW1 is in an ON state, and thereby a voltage follower circuit is formed as a result.

After the exposure period Tex, an operation of reading the signal electric charge from the pixel 20 (a readout operation) and an operation for resetting the signal electric charge accumulated in the pixel 20 (namely, a reset or pixel reset operation) are performed. In this embodiment, since the pixel 20 has a passive pixel circuit, the reset operation is performed along with the readout operation. Note that this reset operation corresponds to the reset operation for the first time (first reset operation) of multiple reset operations that will be described later. Accordingly, this readout period is referred to as a "readout-first reset period Tr1" or merely a "period Tr1" in the following description.

Specifically, during the readout-first reset period Tr1, when the transistor 22 is turned ON, the signal electric charge is read from the accumulation node N in the pixel 20 toward the signal line Lsig, as illustrated in FIG. 6B (see an arrow P11). The signal electric charge that has been read in this manner is input to the charge amplifier circuit. Meanwhile, in the charge amplifier circuit, the switch SW1 is in an OFF state (the charge amplifier circuit is in the readout operation state). In more detail, the switch SW1 of the charge amplifier circuit enters the OFF state, immediately before the transistor 22 enters an ON state. Accordingly, the signal electric charge that has been input to the charge amplifier circuit is accumulated in the capacitative element C1, and the charge amplifier 172 outputs a signal voltage (output voltage Vca) according to the accumulated electric charge. Note that the electric charge accumulated in the capacitative element C1 is reset, when the switch SW1 enters the ON state during the amplifier reset operation described later (the amplifier reset operation is performed).

During the above readout-first reset period Tr1, the following reset operation (first reset operation) is performed, along with the above-described readout operation. Specifically, the first reset operation is performed by utilizing an imaginary short phenomenon occurring in the charge amplifier circuit (charge amplifier 172), as indicated by an arrow P12 of FIG. 6B. In more detail, due to the imaginary short phenomenon, a voltage at the negative input terminal of the charge amplifier 172 (on the signal line Lsig side) becomes substantially equal to a reset voltage Vrst applied to the positive input terminal of the charge amplifier 172. In response, a voltage at the accumulation node N also becomes equal to the reset voltage Vrst. Through this, in this embodiment employing a passive pixel circuit, a voltage at the accumulation node N is reset to a predetermined reset voltage Vrst along with the above-described readout operation, during the readout-first reset period Tr1.

(Remaining of Signal Electric Charge after Readout and Reset)

As described above, the reset operation is performed along with the readout operation, during the readout-first reset period Tr1. However, part of the signal electric charges accumulated in the pixels 20 before the period Tr1 may remain, even after the period Tr1 ends. In the case where part of the signal electric charges remains in the pixels 20, this residual electric charge may cause an afterimage in the next readout operation (when an image is captured during the next frame period). In this case, the quality of the picked-up image could possibly be deteriorated. Hereinafter, a description will be given in detail, of the remaining of signal electric charge as described above, with reference to FIGS. 7 to 12.

When the photoelectric conversion element 21 is configured of a PIN photodiode (thin film photodiode), the photoelectric conversion element 21 is specifically classified into two structural types listed below. Specifically, one type is a so-called lateral structure as illustrated in Parts (A) and (B) of FIG. 7, whereas the other type is a so-called vertical structure as illustrated in FIG. 8.

When having the lateral structure, the photoelectric conversion element 21 has a p-type semiconductor layer 21P, an intrinsic semiconductor (i layer) 21I, and an n-type semiconductor layer 21N along a lateral direction thereof (in an in-plane direction of the lamination thereof) in this order. In addition, the photoelectric conversion element 21 has a gate electrode 21G that is formed in the vicinity of the intrinsic semiconductor 21I while opposing the intrinsic semiconductor 21I through a gate insulating film (not illustrated). Meanwhile, when having the vertical structure, the photoelectric conversion element 21 has, for example, a lower electrode 211a, a p-type semiconductor layer 21P, an intrinsic semiconductor 21I, an n-type semiconductor layer 21N, and an upper electrode 211b along the vertical direction (in the lamination direction) in this order. In this embodiment, a description will be given as to a case where the photoelectric conversion element 21 is a PIN photodiode having a lateral structure of the above two structures.

(Mechanism of Signal Electric Charge Remaining)

It is considered that one reason why the signal electric charge remains as described above is that the electric charge is saturated in the pixel 20 under the influence of ambient light, in particular, strong ambient light. In a photoelectric conversion element 21, the intrinsic semiconductor layer 21I enters any of an accumulation state (saturation state), depletion state, and an inverting state, depending on a gate voltage applied to the gate electrode 21G. However, in a thin film photodiode being in the accumulation or inverting state, it takes several hundred microseconds until a state where electric charge is induced at an interface on the side of the gate electrode 21G (see Part (A) of FIG. 7) transits to the depletion state (see Part (B) of FIG. 7). Typically, a PIN photodiode is used in the depletion state, since the PIN photodiode exhibits the maximum photosensitivity in the depletion state. However, when a PIN photodiode is irradiated with strong ambient light and the relationship Vnp<0V is satisfied, the state of the PIN photodiode transits to the accumulation state. Note that "Vnp" is a voltage potential in the n-type semiconductor layer 21N with reference to the p-type semiconductor layer 21P.

For the above reason, even when the surroundings of the PIN photodiode get dark immediately after a PIN photodiode is irradiated with strong ambient light and a relationship Vnp>0 is satisfied again by the reset operation (first reset operation), the accumulation state of the PIN photodiode does not transit to the depletion state for several hundred microseconds. It is known that the capacitance property of a PIN photodiode in the depletion state is different from that in the accumulation or inverting state, due to the influence of electric charge induced at the interface on the side of the gate electrode 21G. Concretely, the parasitic capacitance Cgp formed between the gate electrode 21G and the p-type semiconductor layer 21P becomes larger in the accumulation state and smaller in the depletion state, as illustrated in Parts (A) and (B) of FIG. 7.

As described above, a potential at the accumulation node N of the pixel 20 is the predetermined reset voltage Vrst after the readout-first reset period Tr1. In this case, when the transistor 22 transits from an ON state to an OFF state, the following phenomenon occurs. Specifically, as illustrated in FIG. 9, for example, the voltage potential at the accumulation node N, which has been the reset voltage Vrst, is slightly varied due to the electric charge accumulated in the parasitic capacitance in the pixel 20 (the parasitic capacitance Cgp formed between the gate and drain of the transistor 22, and the like) (see the arrow P2). Such a phenomenon is called the "charge injection phenomenon".

When the parasitic capacitance Cgp of the PIN photodiode (photoelectric conversion element 21) connected to the accumulation node N differs, depending on whether it is in the depletion, accumulation, or inverting state, the overall coupling amount (magnitude of the parasitic capacitance) in the pixel 20 is changed due to the state transition as described above. Accordingly, optical information (electric charge) which has been entering the PIN photodiode immediately before the readout-first reset period Tr 1 remains at the accumulation node N even after the period Tr1. When the pixel 20 is irradiated with strong ambient light and the electric charge therein is saturated due to the above-described mechanism, part of the signal electric charge which has been accumulated in the pixel 20 may remain therein even after the readout-first reset period Tr1 involving the reset operation. The phenomenon in which signal electric charge remains due to strong ambient light is observed in diodes with a structure in which a gate electrode is disposed below the intrinsic semiconductor 21I as illustrated in Parts (A) and (B) of FIG. 7. However, even without a gate electrode, regardless of whether the structure is lateral or vertical, when any diode is irradiated with strong ambient light and the electric charge is therefore saturated, the signal electric charge remains therein. To be exact, when a diode being in the state where the electric charge is not saturated is irradiated with strong ambient light, generated carriers are captured at a trap level, and considerable time is necessary for these carriers to be discharged therefrom.

In not only the above case (where electric charge is saturated due to the influence of strong ambient light) but also the following case, the signal electric charge may remain. Specifically, in the case where a Decay current is generated by a photoelectric conversion element 21 (PIN photodiode), the residual electric charge is generated.

Parts (A) and (B) of FIG. 10 illustrate an energy band structure (a relationship between an energy level and the position of each layer) of the above-described PIN photodiode. As can be seen from FIG. 10, many defect levels Ed are present in the intrinsic semiconductor layer 21I. Immediately after the readout-first reset period Tr1, electric charges e are captured (trapped) at these defect levels Ed, as illustrated in Part (A) of FIG. 10. Meanwhile, after a considerable time has passed since the readout-first reset period Tr1 ends, the electric charges e that have been trapped at the defect levels Ed are released from the intrinsic semiconductor layer 21I to the outside of the photodiode (photoelectric conversion element 21) (see a dashed-line arrow in Part (B) of FIG. 10), as illustrated in Part (B) of FIG. 10. Through this, the above-described Decay current (current Idecay) is generated from the photoelectric conversion element 21.

FIGS. 11A and 11B depict an example of a relationship between elapsed time after the readout-first reset period Tr1 and a current Idecay. In FIG. 11A, each of the vertical and horizontal axes are on a log scale. In FIG. 11B, the vertical axis is on a log scale, and the horizontal axis is on a linear scale. The respective areas surrounded by dotted lines in FIGS. 11A and 11B are mutually related. As can be seen from FIGS. 11A and 11B, the current Idecay tends to be synergistically decreased with time since the readout-first reset period Tr1 ends (t=0) (Idecay=($I_0$/t), $I_0$: constant value). In addition, as shown in FIG. 12, for example, the residual electric charge (denoted by q1) generated at this time is determined by integrating the current Idecay (=$I_0$/t) with respect to the elapsed time t. The Decay current generated by the photoelectric conversion element 21 in this manner also causes residual electric charge to be generated in the pixel 20. Further, the variation in the parasitic capacitance Cgp as described above and/or the amount of the residual electric charge caused by the Decay current vary depending on a photoelectric conversion material and the like for the photoelectric conversion element 21.

For the above reason (irradiation of strong ambient light or generation of Decay current), the residual electric charge q1 is also generated in the pixel 20, even after the readout-first reset period Tr1 involving the reset operation.

(Multiple Reset Operations)

In this embodiment, the reset operation is performed multiple times (in this case, twice, including the reset operation during the readout-first reset period Tr1). In addition, readout operation and reset operation are performed in a line-sequential manner as will be described later. Specifically, readout operation and multiple reset operations are performed by one line-sequential operation. This operation manner decreases the residual electric charge described above, thereby suppressing the occurrence of an afterimage due to the residual electric charge. Hereinafter, multiple reset operations will be described in detail.

Specifically, as illustrated in FIG. 13, the readout operation and the first reset operation are performed during the readout-first reset period Tr1 that comes after the exposure period Tex within one vertical period (one frame period) ΔTv. Subsequently, after a predetermined time interval, a reset operation for the second time (a second reset operation) is performed during a second reset period Tr2. In addition, out of these operations, the readout operation and the reset operations during the periods Tr1 and Tr2 are performed in a line-sequential manner (the line-sequential readout operation and the line-sequential reset operation are performed in the pixels 20 based on the control by the system control section 16).

Part (A) of FIG. 14 depicts a timing waveform of a potential Vread in the readout control line Lread; Part (B) of FIG. 14 depicts a timing waveform of the output voltage Vca of the charge amplifier 172; Part (C) of FIG. 14 depicts a timing waveform of a potential Vsig in the signal line Lsig and Part (D) of FIG. 14 depicts a timing waveform of a potential Vn at the accumulation node N. Note that these timing waveforms extend over a period including the frame period ΔTv and a pre and post-periods thereof.

In the frame period ΔTv, first, the exposure operation is performed during the exposure period Tex (between timings t11 and t12), as described above with reference to FIG. 6A, and a photoelectric conversion element 21 in each pixel 20 converts incident image pickup light Lin into a signal electric charge (photoelectric conversion). This signal electric charge is accumulated in the accumulation node N of the pixel 20, so that the potential Vn at the accumulation node N is gradually changed (see an arrow P31 of Part (D) of FIG. 14). In this case, since the cathode of the photoelectric conversion element 21 is connected to the accumulation node N, the potential Vn is gradually decreased from the reset voltage Vrst toward 0V during the exposure period Tex.

Then, as described above, the first reset operation is performed along with the readout operation during the readout-first reset period Tr1 (between timings t13 and t14). It is to be noted that, the switch SW1 of the charge amplifier circuit enters an OFF state at a timing t13' that comes immediately before the timing t13 comes (immediately before the transistor 22 enters an ON state). Further, the switch SW1 of the charge amplifier circuit enters an ON state at a timing 115 after this, so that the electric charge accumulated in the capacitative element C1 of the charge amplifier circuit is reset (the amplifier reset operation is performed).

After the readout-first reset period Tr1 ends, residual electric charge q1 is generated for the above-described reason, and the potential Vn at the accumulation node N is gradually decreased (see an arrow P32 of Part (D) of FIG. 14).

The second reset operation that will be described below is performed during the second reset period Tr2 (between timings t16 and t17) which comes after a predetermined interval (reset interval A) passes since the readout-first reset period Tr1 ends.

(Second Reset Operation)

During the second reset period Tr2, specifically, the second reset operation is performed, for example, as in a first operation example illustrated in FIG. 15A. Specifically, the transistor 22 in the pixel 20 enters an ON state, and the switch SW1 in the charge amplifier circuit also enters an ON state. As a result, a voltage follower circuit using the charge amplifier 172 is formed. Due to the feedback characteristics, a voltage at the negative input terminal of the charge amplifier 172 becomes substantially equal to the reset voltage Vrst applied to the positive input terminal thereof. In this first operation example, by utilizing the feedback characteristics of the charge amplifier 172 in this manner, the potential Vn at the accumulation node N in the pixel 20 is displaced to the reset voltage Vrst (the second reset operation is performed).

Alternatively, the second reset operation may be performed as in a second operation example illustrated in FIG. 15B. Specifically, similarly to the above-described first reset operation, the second reset operation may be performed by utilizing the imaginary short phenomenon in the charge amplifier circuit (see an arrow P42 of FIG. 15B). This imaginary short phenomenon also causes the potential Vn at the accumulation node N in the pixel 20 to be displaced to the reset voltage Vrst. In this example, however, since the transistor 22 in the pixel 20 is in an ON state and the switch SW1 in the charge amplifier circuit is in an OFF state, similarly to the state during the readout-first reset period Tr1, the charge amplifier circuit is in the readout operation state. In other words, in this second operation example, it is possible to read the electric charge remaining at the accumulation node N by the charge amplifier circuit as indicated by an arrow P41 of FIG. 15B.

As described above, in this embodiment, the reset operations for the electric charge accumulated in the pixel 20 are repeated intermittently during one frame period (the reset operation is performed multiple times). In this case, specifically, the first and second reset operations are performed (during the readout-first reset period Tr1 and the second reset period Tr2, respectively) with a predetermined reset interval A in between. This reduces the residual electric charge q1 (the amount of residual signal electric charge) in the pixel 20 after the first reset operation (see an arrow P33 in Part (D) of FIG. 14).

In more detail, when a time between the end of the first reset operation (the end of Tr1) and the end of the second reset operation (the end of Tr2) is denoted by Δt12 (that corresponds to the reset interval A), the reduced amount of the residual electric charge q1 is, for example, as illustrated in FIG. 16. Specifically, the second reset operation discharges (reduces) electric charge q12, which corresponds to a value obtained by integrating the residual electric charge q1 described, for example, with reference to FIG. 12, with respect to the time between the start point t1(=0) and the end point t2 of the time Δt12.

However, even after the second reset period Tr2, signal electric charge is still accumulated (electric charge q23 obtained by q1−q12=q23), and this electric charge q23 could possibly cause an afterimage.

(Reset Timing Correction Operation)

In consideration of this disadvantage, in this embodiment, the duration of the time Δt12, namely, the reset interval A is corrected (adjusted) appropriately, in order to minimize residual electric charge after the second reset operation. In this case, based on the control of the system control section 16, the reset timing correction section 18 determines a reset interval A that allows an afterimage in a captured image to be reduced sufficiently to a desired value, and corrects the second reset timing (between timings t16 and t17).

Specifically, the reset timing correction section 18 selects an optimal reset interval A by utilizing the correlation (lookup table) between the reset interval A and afterimage characteristics which is stored in advance. Following this, the reset timing correction section 18 corrects (adjusts) the second reset timing, on the basis of the selected reset interval A. As described above, in the image pickup section 11, the potential (Vn) at the accumulation node N is displaced, due to the residual electric charge remaining after readout. The afterimage characteristics at this time are unique to the image pickup section 11.

FIG. 17 depicts the change in Decay with time (afterimage characteristics). This graph is created by reading signal electric charge at a frame 0, plotting the amount (%) of residual electric charge at a frame 1 and subsequent frames when the amount of the signal electric charge read after frame 0 is 100%, and approximating the plotted amounts. Note that frames 0, 1, 2, and so on are obtained at continuous timings, for example, at 50 frames per second. Further, FIG. 18 depicts a relationship between the reset interval A (ms) and the amount (%) of the residual electric charge. Specifically, this graph of FIG. 18 depicts the amount of residual electric charge in one frame (the amount of signal electric charge read at the frame 0 is 100%), when the reset interval A is varied at the frame 0 of FIG. 17.

As can be seen from FIGS. 17 and 18, due to the afterimage characteristics which is unique to the photoelectric conversion element 21, the signal electric charge is gradually discharged (reduced) as time elapses, and the amount of the residual electric charge is reduced depending on the reset interval A (as the length of the reset interval A becomes longer). In other words, it can be seen from FIGS. 17 and 18 that the Decay and afterimage characteristics of the image pickup section 11 greatly depend on the reset interval A.

FIG. 19 depicts a correlation between the reset interval A and afterimage characteristics for the correction lookup table. This graph is created by, for example, plotting the amounts of the residual electric charge at a frame subsequent to the frame 0 of FIG. 17 while the reset interval A between the first and second reset operations is varied at the frame 0, and approximating the plotted amounts. By referring to the graph having been created in this manner upon correction, the reset timing correction section 18 selects a value (A1) of the reset interval A which allows the afterimage value to be equal to or less than a specified value (for example, 1%). Then, the reset timing correction section 18 corrects (adjusts) the reset timing (second reset timing) such that the reset interval A is the value A1. The reset timing correction section 18 outputs the correction data Dt concerning the corrected reset timing to the system control section 16, and the system control section 16 performs reset operation of the pixels 20 based on the corrected reset timing.

It is desirable that the above multiple reset operations be performed intermittently, for example, over a period exceeding one horizontal period (one horizontal scanning period, (for example, about 32 microseconds)) of the line-sequential driving. The reason for this is as follows. As described above, several hundred microseconds are necessary for a PIN photodiode to transit its states. Accordingly, by applying the reset voltage Vrst to the accumulation node N continuously or intermittently, for example, for about 100 microseconds, the occurrence of the residual electric charge is reduced. In fact, experiments and the like have demonstrated that the residual electric charge starts to be greatly reduced when a period over which the reset voltage Vrst is applied to the accumulation node N exceeds one horizontal period (for example, about 32 microseconds).

As described above, in this embodiment, in the pixels 20 in the image pickup section 11, the photoelectric conversion is performed on the basis of the image pickup light Lin, and the readout operation and the reset operation of the signal electric charge at the pixels described above are performed, and thereby a picked-up image based on the image pickup light Lin is obtained. The reset timing correction section 18 corrects the reset interval A (reset timing) to reduce an afterimage in this picked-up image. This suppresses the occurrence of an afterimage due to the residual electric charge, even when the electric charge is accumulated after the signal electric charge is read. Consequently, it is possible to achieve high quality in picked-up images.

The embodiment has been described by giving an example in which the reset operation is performed twice during one frame period, however, the number of times which reset operation is performed is not limited to twice. Alternatively, the reset operation may be performed three times or more during one frame period. In this case, it is necessary that the reset timing correction section 18 optimizes a reset interval between the last reset period and the previous reset period during one frame period at the minimum. Specifically, in the case where the reset operation is performed n times (n is an integer of 3 or more), it is necessary that the reset timing correction section 18 adjusts a reset interval between the n-th and (n−1)h reset operations and to correct the n-th (last) reset timing at the minimum. In this case, the reset timing correction section 18 may adjust both the n-th and (n−1)th reset timings, or only one of them (desirably, the n-th reset timing). In addition, the reset timing correction section 18 may selectively correct one or more of the reset intervals, or may correct all of the reset intervals.

Next, Modification examples (Modification examples 1 to 5) of the above-described embodiment will be described. Note that the same components as those in the above-described embodiment will be given the same reference numbers, and a description thereof will be omitted as appropriate.

Modification Example 1

FIG. 20 illustrates a circuit configuration of a pixel (pixel 20A) according to Modification example 1, together with the circuit configuration of the column selection section 17 that has been described in the above embodiment. The pixel 20A of Modification example 1 has a so-called passive circuit configuration similar to that of the pixel 20 of the embodiment, and includes one photoelectric conversion element 21 and one transistor 22. In addition, the pixel 20A is connected to the readout control line Lread and the signal line Lsig that extend along the H and V directions, respectively.

However, the pixel 20A of Modification example 1 is different from the pixel 20 of the above-described embodiment, in that an anode of the photoelectric conversion element 21 is connected to the accumulation node N, and a cathode thereof is connected to the ground (is grounded). As described above, the anode of the photoelectric conversion element 21 may be connected to the accumulation node N in the pixel 20A. Also with this configuration, it is possible to produce an effect same as that of the image pickup device 1 of the embodiment.

Modification Example 2

FIG. 21 illustrates a circuit configuration of a pixel (pixel 20D) according to Modification example 2, together with the circuit configuration of the column selection section 17 that has been described in the embodiment. The pixel 20D of Modification example 2 has a so-called passive circuit configuration similar to that of the pixel 20 of the embodiment, and includes one photoelectric conversion element 21. In addition, the pixel 20D is connected to the readout control line Lread and the signal line Lsig that extend along the H and V directions, respectively.

The pixel 20D of Modification example 2 includes two transistors (transistors 22A and 22B). These two transistors 22A and 22B are connected in series to each other (specifically, a source or drain of one transistor is electrically connected to a source or drain of the other transistor, or semiconductor layers of the transistors are integrally formed so as to be connected to each other). Furthermore, the respective gates of the transistors 22A and 22B are connected to the readout control line Lread. Arranging the gate electrodes in parallel as in Modification example 2 enables the off-leak (leak current at Vg=0V) to be decreased. Although two gate electrodes are arranged in parallel in Modification example 2, three or more gate electrodes may be arranged in parallel instead.

As described above, the two transistors 22A and 22B connected in series to each other may be provided in the pixel 20D. With this configuration, it is also possible to produce an effect same as that of the image pickup device 1 of this embodiment.

Modification Examples 3 and 4

FIG. 22 illustrates a circuit configuration of a pixel (pixel 20B) according to Modification example 3, together with an example of a circuit configuration of a column selection section 17B that will be described hereinafter. FIG. 23 illustrates a circuit configuration of a pixel (pixel 20C) according to Modification example 4, together with the example of the circuit configuration of the column selection section 17B. Each of the pixels 20B and 20C according to Modification examples 3 and 4, respectively, has a so-called active pixel circuit, which is different from the pixel circuits in the above-described pixel 20 and 20A.

Each of the active pixels 20B and 20C includes a photoelectric conversion element 21 and three transistors 22, 23, and 24. In addition, each of the pixels 20B and 20C is connected to the readout control line Lread and the reset control line Lrst that both extend in the H direction and the signal line Lsig that extends in the V direction.

In each of the pixels 20B and 20C, a gate of the transistor 22 is connected to the readout control line Lread; a source thereof is connected to the signal line Lsig; and a drain thereof is connected to a drain of the transistor 23 that configures a source follower circuit. A source of the transistor 23 is connected to an electric power source VDD, and a gate thereof is connected, through the accumulation node N, to a cathode (example of FIG. 22) or an anode (example of FIG. 23) of the photoelectric conversion element 21 and to a drain of the transistor 24 that functions as a reset transistor. A gate of the transistor 24 is connected to the reset control line Lrst, and a source thereof receives a reset voltage Vrst. In Modification example 3 illustrated in FIG. 22, the anode of the photoelectric conversion element 21 is connected to the ground. Meanwhile, in Modification example 4 illustrated in FIG. 23, the cathode of the photoelectric conversion element 21 is connected to the ground.

In each of Modification examples 3 and 4, the column selection section 17B has a structure in which a constant current source 171 and an amplifier 176 are provided in the above-described column selection section 17, instead of the charge amplifier 172, the capacitative element C1, and the switch SW1. The amplifier 176 has a positive input terminal connected to the signal line Lsig, and a negative input terminal and an output terminal connected to each other, thus configuring a voltage follower circuit. It is to be noted that one terminal of the constant current source 171 is connected to an end of the signal line Lsig, and the other terminal thereof is connected to an electric power source VSS.

In an image pickup device including any of pixels 20B and 20C having the above-described active circuit configuration, an afterimage may also occur, due to residual electric charge after signal electric charge is read. Accordingly, in Modification examples 3 and 4, the reset operation is performed multiple times, and the reset interval A is corrected in accordance with the afterimage characteristics, in a manner similar to that of the above-described embodiment. Consequently, it is possible to reduce an afterimage, and thereby to achieve high quality in picked-up images also in Modification examples 3 and 4. However, an image pickup operation (line-sequential image pickup driving) is performed in the pixels 20B and 20C having the active circuit configuration in the following manner.

As illustrated in FIG. 24, for example, line-sequential readout operation and multiple (two in this case) line-sequential reset operations are performed independently of one another (intermittently). In more detail, the line-sequential readout operation that causes a line-sequential operation during a readout period Tr1a, the first line-sequential reset operation that causes a line-sequential operation during a reset period for the first time (a first reset period Tr1b), and the second line-sequential reset operation that causes a line-sequential operation during a reset period for the second time (a second reset period Tr2) are performed independently of one another. Note that in the case where a pixel employs an active circuit configuration, each reset operation is performed when the transistor 24 that functions as a reset transistor enters an ON state.

Modification Examples 5 and 6

FIGS. 25A and 25B schematically illustrate general configurations of image pickup sections (image pickup sections 11A and 11B) according to Modification examples 5 and 6, respectively.

In addition to a photoelectric conversion layer 111 that has been described in the above embodiment, the image pickup section 11A according to Modification example 5 of FIG. 25A further includes a wavelength conversion layer 112 on (a light receiving surface side of) the photoelectric conversion layer 111. This wavelength conversion layer 112 is configured to convert a wavelength of radiation Rrad ($\alpha$, $\beta$, $\gamma$, X rays, etc.) into that which falls within the sensitivity range of the photoelectric conversion layer 111. This conversion allows the photoelectric conversion layer 111 to read information based on the radiation Rrad. The wavelength conversion layer 112 may be formed of, but is not limited to, a fluorescent substance such as a scintillator, that converts radiation such as X rays, into visible rays. The above-described wavelength conversion layer 112 may have a structure in which an organic planarization film, a planarization film made of a spin-on-glass material or the like, and a fluorescent substance film are stacked in this order. The fluorescent substance film may be made of, for example, CsI:Tl, $Gd_2O_2S$, BaFX (X is Cl, Br, I, etc.), NaI, and $CaF_2$. This image pickup section 11A is applicable to, for example, so-called indirect type radiation image pickup devices.

The image pickup section 11B according to Modification example 6 of FIG. 25B is different from the above-described embodiment in that the image pickup section 11B has a photoelectric conversion layer 111B that converts incident radiation Rrad into an electrical signal. The photoelectric conversion layer 111B may be made of for example, an amorphous-selenium (a-Se) semiconductor, cadmium telluride (CdTe) semiconductor, or the like. This image pickup section 11B is applicable to, for example, so-called direct type radiation image pickup devices.

Image pickup devices including any of the image pickup sections 11A and 11B according to Modification examples 5 and 6, respectively, are utilized as various types of radiation image pickup devices that obtain an electrical signal on the basis of incident radiation Rrad. These radiation image pickup devices are applicable to, for example, medical X-ray image pickup devices (digital radiography devices, etc.), X-ray photographic devices for inspecting carrying baggage which is to be used in airports and the like, and industrial X-ray image pickup devices (for example, devices for inspecting dangerous articles on a container or the contents in bags, etc.).

Modification Example 7

The above-described embodiment has been described as the case where the potentials Vrst of the same level are applied to the accumulation node N during the reset periods (Tr1 and Tr2) when the multiple reset operations are performed. However, the levels of the reset potentials Vrst may not be equal for the reset periods. For example, a circuit configuration may be employed, in which gate pulses of three or more different levels are output, and reset potentials of different levels may be applied to the accumulation node N for the respective reset periods. In this case, a correlation between the reset voltage level and afterimage characteristics is measured in advance, and is stored as the correction lookup table, in addition to the above correlation between the reset interval A and the afterimage characteristics. In this way, by using the reset voltage level as a correction parameter in addition to the reset interval (reset timing), it is possible to produce an effect in which residual electric charge is discharged as described above, as well as an effect in which the slight variation in (charge injection of) a reset potential Vrst that accompanies the reset operation is reduced. This achieves a higher-quality image.

When different reset voltage levels are used for respective reset operations, as described above, it is desirable that the second reset voltage level be set to be lower than the first reset voltage level. This reduces the charge injection more effectively.

The above-described manner is also applicable to a case where the reset operation is performed three or more times during one frame period. In this case, the reset timing correction section 18 may simply set a reset voltage level for the last reset operation to be lower than that for the previous reset operation during one frame period. Specifically, when the reset operation is performed n times (n is an integer of 3 or more) during one frame period, the reset timing correction section 18 may simply set a reset voltage level for the n-th reset operation to be lower than that for the (n−1)th reset operation.

Application Example

Next, a description will be given below, of an image pickup display system to which the image pickup device according to any of the embodiment and Modification examples (Modification examples 1 to 7) is applicable.

FIG. 26 schematically illustrates an example of a general configuration of an image pickup display system (image pickup display system 5) according to Application example. The image pickup display system 5 includes the image pickup device 1 that has the image pickup section 11 (11A or 11B) and the like according to the above-described embodiment and the like, an image processing section 52, and a display device 4. In this example, the image pickup display system 5 is configured as an image pickup display system using radiation (radiation image pickup display system).

The image processing section 52 is configured to perform predetermined image processing on output data Dout (image pickup signal) output from the image pickup device 1, thereby generating image data D1. The display device 4 is configured to display an image based on the image data D1 which has been generated in the image processing section 52 on a predetermined monitor screen 40.

In the image pickup display system 5, the image pickup device 1 (radiation image pickup device in this case) acquires image data Dout of an object 50, on the basis of irradiation light (radiation in this case) emitted to the object 50 from a light source 51 (radiation source such as an X-ray source in this case), and then, outputs the image data Dout to the image processing section 52. The image processing section 52 performs the above-described predetermined image processing to the received image data Dout, and then, outputs the processed image data (display data) D1 to the display device 4. The display device 4 displays image information (picked-up image) on the monitor screen 40, on the basis of the received image data D1.

As described above, the image pickup display system 5 acquires the image of the object 50 in the image pickup device 1, as an electrical signal. Accordingly, the image pickup display system 5 displays the image of the object by transmitting the acquired electrical signal to the display device 4. Thus, it is possible to observe the image of the object 50 without using a radiation photographic film, as in the related technique. In addition, the image pickup display system 5 is also configured to shoot and display moving images.

It is to be noted that, Application example has been described by exemplifying the case where the image pickup device 1 is configured as a radiation image pickup device, and the image pickup display system serves as an image pickup display system using radiation. However, the image pickup display system according to an embodiment of the present disclosure may be applied to that including other types of image pickup devices.

Hereinbefore, the embodiment, Modification examples and Application example have been described. However, the present disclosure is not limited to the embodiment and the like, and various modifications may be made. For example, the circuit configuration of the pixel in the image pickup section is not limited to those described in the embodiment and the like (the circuit configurations of the pixels 20 and 20A to 20D), and may be another configuration. Likewise, the circuit configurations of the row scanning section, the column selection section, and the like are not limited to those having been described in the embodiment and the like, and may have other configurations.

In the above embodiment and the like, environmental conditions (including a temperature, a tube voltage, and a driving frequency) and the like may also be considered when the reset timing and the reset voltage level are corrected. In this case, correlations between each of the parameters such as the temperature, the tube voltage, the driving frequency, and the like and afterimage characteristics may be stored as the lookup table in advance. By correcting the reset timing (or both the reset timing and the reset voltage level) in consideration of the environmental conditions in this manner, the above-described, effect is obtained more effectively when photoelectric conversion elements 21 highly dependent on to the ambient environments are used.

Further, the embodiment and the like have been described with the case where the reset operation (including the reset operation performed along with the readout operation when the driving circuit is of a passive type) is performed multiple times during one frame period. However, the embodiment of the present disclosure is also applicable to a case where the reset operation is performed only once during one frame period. Thus, as long as a reset operation discharges electric charge at an appropriate timing which has been accumulated with time after the readout operation, as described above, the effect of the embodiment of the present disclosure is obtainable.

For example, when an active circuit configuration is employed, the readout operation and the reset operation are performed independently of each other as described above. Therefore, it is possible to adjust the timing of the reset operation to be performed immediately after the readout operation. This makes it possible to optimize a time interval (corresponding to the above-described reset interval A) between the periods of the readout operation and the reset operation, on the basis of the relationship between the interval and afterimage characteristics, when reset operation is applied in such a way that the reset operation is performed only once during one frame period. Thus, through procedures similar to those described in the embodiment and the like, it is possible to create and store, in advance, the correlation between afterimage characteristics and the time interval (referred to as a "readout-reset interval") between the readout period and the reset period. Using this correlation allows the readout-reset interval to be optimized, so that the occurrence of an afterimage due to the residual electric charge is suppressed.

For example, the image pickup section, the row scanning section, the A/D conversion section (column selection section), the column scanning section, and the like which have been described in the embodiment and the like may be formed on the same substrate. Specifically, by using a polycrystalline semiconductor such as a low-temperature polycrystalline silicon, switches in these circuit parts may be formed on the same substrate. This allows a driving operation to be performed on the same substrate, on the basis of a control signal from, for example, an external system control section. This achieves the narrow frames of the circuits (three-side free frame structure) and the improvement of the reliability of wire connections.

It is possible to achieve at least the following configurations from the above-described example embodiment and the modifications of the disclosure.

(1) An image pickup device including:
an image pickup section including a plurality of pixels, the pixels each including a photoelectric conversion element;
a drive section performing a readout operation and a reset operation of a signal electric charge, the signal electric charge being accumulated in the pixel; and
a correction section correcting a timing of performing the reset operation to allow an afterimage in an image output from the image pickup section to be reduced.

(2) The image pickup device according to (1), wherein
the drive section intermittently performs the reset operation multiple times during one frame period, and
the correction section corrects the timing by optimizing a time interval of the reset operation, the time interval being a reset interval.

(3) The image pickup device according to (2), wherein
the correction section stores a correlation between the reset interval and afterimage characteristics in advance, and the correction section uses the correlation to select the reset interval that allows an afterimage value to be equal to or less than a desired value, and
the correction section adjusts the timing in accordance with the selected reset interval.

(4) The image pickup device according to (2) or (3), wherein the reset operation of the signal electric charge in the pixel is performed in association with the readout operation by the drive section.

(5) The image pickup device according to (4), wherein, during the one frame period, the drive section performs the reset operation multiple times to allow one, or two or more reset operations to be performed intermittently after a first reset operation, the first reset operation being the reset operation in association with the readout operation.

(6) The image pickup device according to (5), wherein
during the one frame period, the drive section performs the reset operation multiple times to allow an n number of reset operations in total to be performed, n being an integer of two or larger, the n number of reset operations including the first reset operation, and the drive section performs an n-th reset operation based on the corrected timing, after an (n−1)th reset operation.

(7) The image pickup device according to (6), wherein
during the one frame period, the drive section performs the reset operation twice in total that includes the first reset operation.

(8) The image pickup device according to any one of (1) to (7), wherein
the correction section corrects a reset voltage to be applied to a transistor in the pixel upon the reset operation, in addition to the timing.

(9) The image pickup device according to (8), wherein
during the one frame period, the drive section performs the reset operation multiple times to allow an n number of reset operations in total to be performed, n being an integer of two or larger, the n number of reset operations including the first reset operation, and the drive section uses the reset voltage corrected by the correction section to perform an n-th reset operation.

(10) The image pickup device according to (9), wherein the drive section uses a reset voltage lower than a reset voltage of an (n−1)th reset operation to perform the nth reset operation.

(11) The image pickup device according to any one of (1) to (10), wherein the correction section corrects the timing in consideration of an environmental condition.

(12) The image pickup device according to any one of (1) to (11), wherein the correction section corrects the timing, before one of activation of the image pickup device and moving image shooting.

(13) The image pickup device according to any one of (1) to (12), wherein the photoelectric conversion element includes one of a PIN photodiode and an MIS sensor.

(14) The image pickup device according to any one of (1) to (13), wherein the image pickup section generates an electrical signal, based on incident radiation.

(15) The image pickup device according to (14), wherein the image pickup section includes, on the photoelectric conversion elements, a wavelength conversion layer, the wavelength conversion layer converting a wavelength of the radiation into a wavelength that falls within a sensitivity range of the photoelectric conversion elements.

(16) The image pickup device according to (14) or (15), wherein the radiation includes X rays.

(17) The image pickup device according to any one of (14) to (16), further including a transistor driving the pixels, the transistor being made of one of amorphous silicon, polysilicon, microcrystal silicon, and an oxide semiconductor.

(18) An image pickup display system including:
an image pickup device; and
a display device displaying an image based on an image pickup signal obtained by the image pickup device,
the image pickup device including
an image pickup section including a plurality of pixels, the pixels each including a photoelectric conversion element,
a drive section performing a readout operation and a reset operation of a signal electric charge, the signal electric charge being accumulated in the pixel, and
a correction section correcting a timing of performing the reset operation to allow an afterimage in an image output from the image pickup section to be reduced.

The present disclosure contains subject matter related to that disclosed in Japanese Priority Patent Application JP 2011-228628 filed in the Japan Patent Office on Oct. 18, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image pickup device comprising:
an image pickup section including a plurality of pixels, each of the plurality of pixels including a photoelectric conversion element;
a drive section performing a readout operation and a reset operation of a signal electric charge, the signal electric charge being accumulated in a pixel of the plurality of pixels; and
a correction section correcting a reset interval between reset operations performed during one frame period based on a correlation between the reset interval and afterimage characteristics to allow the afterimage in an image output from the image pickup section to be reduced, wherein the correction section stores the correlation between the reset interval and the afterimage characteristics in advance, and the correction section uses the correlation to select the reset interval that allows an afterimage value to be equal to or less than a desired value.

2. The image pickup device according to claim 1, wherein the reset operation of the signal electric charge in the pixel is performed in association with the readout operation by the drive section.

3. The image pickup device according to claim 2, wherein, during the one frame period, the drive section performs the reset operation multiple times to allow one, or two or more reset operations to be performed intermittently after a first reset operation, the first reset operation being the reset operation in association with the readout operation.

4. The image pickup device according to claim 3, wherein during the one frame period, the drive section performs n number of reset operations including the first reset operation, wherein n is an integer greater than or equal to two and the drive section performs an n-th reset operation based on the corrected reset interval, after an (n−1)th reset operation.

5. The image pickup device according to claim 4, wherein during the one frame period, the drive section performs the reset operation twice in total that includes the first reset operation.

6. The image pickup device according to claim 1, wherein the correction section corrects a reset voltage to be applied to a transistor in the pixel upon the reset operation.

7. The image pickup device according to claim 6, wherein during the one frame period, the drive section performs n number of reset operations including the first reset operation, wherein n is an integer greater than or equal to two and the drive section uses the reset voltage corrected by the correction section to perform an n-th reset operation.

8. The image pickup device according to claim 7, wherein the drive section uses a reset voltage lower than a reset voltage of an (n−1)th reset operation to perform the nth reset operation.

9. The image pickup device according to claim 1, wherein the correction section corrects the reset interval in consideration of an environmental condition.

10. The image pickup device according to claim 1, wherein the correction section corrects the reset interval before one of activation of the image pickup device and shooting a moving image.

11. The image pickup device according to claim 1, wherein the photoelectric conversion element includes one of a PIN photodiode and an MIS sensor.

12. The image pickup device according to claim 1, wherein the image pickup section generates an electrical signal, based on an incident radiation.

13. The image pickup device according to claim 12, wherein the image pickup section includes, on the photoelectric conversion elements, a wavelength conversion layer, the wavelength conversion layer converting a wavelength of the radiation into a wavelength that falls within a sensitivity range of the photoelectric conversion elements.

14. The image pickup device according to claim 12, wherein the incident radiation includes X rays.

15. The image pickup device according to claim 1, further comprising a transistor driving the plurality of pixels, the transistor being made of one of amorphous silicon, polysilicon, microcrystal silicon, and an oxide semiconductor.

16. An image pickup display system comprising:
an image pickup device; and
a display device displaying an image based on an image pickup signal obtained by the image pickup device,
the image pickup device including:
an image pickup section including a plurality of pixels, each of the plurality of pixels including a photoelectric conversion element,
a drive section performing a readout operation and a reset operation of a signal electric charge, the signal electric charge being accumulated in a pixel of the plurality of pixels, and
a correction section correcting a reset interval between reset operations performed during one frame period based on a correlation between the reset interval and afterimage characteristics to allow the afterimage in an image output from the image pickup section to be reduced,
wherein the correction section stores the correlation between the reset interval and the afterimage characteristics in advance, and the correction section uses the correlation to select the reset interval that allows an afterimage value to be equal to or less than a desired value.

17. An image pickup device comprising:
an image pickup section including a plurality of pixels, each of the plurality of pixels including a photoelectric conversion element;
a drive section performing a readout operation and a reset operation of a signal electric charge, the signal electric charge being accumulated in a pixel of the plurality of pixels; and
a correction section correcting a timing of performing the reset operation to allow an afterimage in an image output from the image pickup section to be reduced,
wherein the drive section intermittently performs the reset operation multiple times during one frame period, and the correction section corrects the timing by optimizing a time interval of the reset operation, the time interval being a reset interval,
wherein the correction section stores a correlation between the reset interval and afterimage characteristics in advance, and the correction section uses the correlation to select the reset interval that allows an afterimage value to be equal to or less than a desired value, and the correction section adjusts the timing in accordance with the selected reset interval.

* * * * *